(12) United States Patent
Bissell et al.

(10) Patent No.: US 11,199,366 B2
(45) Date of Patent: Dec. 14, 2021

(54) ENERGY STORAGE SYSTEMS

(75) Inventors: Andrew Bissell, East Lothian (GB); John Field, East Lothian (GB)

(73) Assignee: Sunamp Limited, East Lothian (GB)

( * ) Notice: Subject to any disclaimer, the term of this patent is extended or adjusted under 35 U.S.C. 154(b) by 1492 days.

(21) Appl. No.: 12/992,591

(22) PCT Filed: Apr. 30, 2009

(86) PCT No.: PCT/GB2009/050449
§ 371 (c)(1),
(2), (4) Date: Jun. 6, 2011

(87) PCT Pub. No.: WO2009/138771
PCT Pub. Date: Nov. 19, 2009

(65) Prior Publication Data
US 2011/0226440 A1    Sep. 22, 2011

(30) Foreign Application Priority Data

May 16, 2008   (GB) ..................................... 0808930

(51) Int. Cl.
*F28D 20/00* (2006.01)
*F28D 20/02* (2006.01)

(52) U.S. Cl.
CPC ....... *F28D 20/0039* (2013.01); *F28D 20/026* (2013.01); *F28D 2020/0082* (2013.01); *Y02B 10/20* (2013.01); *Y02E 60/14* (2013.01); *Y02E 70/30* (2013.01)

(58) Field of Classification Search
CPC .. B32B 5/00; F28F 7/00; F28F 13/003; H01L 23/3733; H05K 7/2029; H05K 7/20336; H05K 7/20309; F28D 2020/0013; F28D 20/02; F28D 20/025; F28D 20/0039; F28D 20/026; F28D 2020/0082
USPC .......................................... 165/10, 42.2, 133
See application file for complete search history.

(56) References Cited

U.S. PATENT DOCUMENTS

| | | | |
|---|---|---|---|
| 3,623,549 A | 11/1971 | Smith, Jr. | |
| 3,989,927 A | 11/1976 | Erb | |
| 4,182,409 A * | 1/1980 | Robinson, Jr. ........ | F24D 11/003 126/400 |
| 4,199,021 A | 4/1980 | Thoma | |
| 4,250,866 A | 2/1981 | Telkes | |

(Continued)

FOREIGN PATENT DOCUMENTS

| | | |
|---|---|---|
| AT | 382636 B | 3/1987 |
| AT | 508992 A1 | 5/2011 |

(Continued)

OTHER PUBLICATIONS

Communication Pursuant to Article 94(3) EPC, EP Application No. 097460885-1602, EPO (dated May 3, 2017).

(Continued)

*Primary Examiner* — Harry E Arant
(74) *Attorney, Agent, or Firm* — Wright IP & International Law; Eric G. Wright

(57) ABSTRACT

There is herein described energy storage systems. More particularly, there is herein described thermal energy storage systems and use of energy storable material such as phase change material in the provision of heating and/or cooling systems in, for example, domestic dwellings.

23 Claims, 10 Drawing Sheets

(56) References Cited

U.S. PATENT DOCUMENTS

| | | | |
|---|---|---|---|
| 4,402,188 A * | 9/1983 | Skala | A47J 27/17 |
| | | | 165/10 |
| 4,637,219 A | 1/1987 | Grose | |
| 4,727,726 A | 3/1988 | Mitani et al. | |
| 4,750,543 A * | 6/1988 | Edelstein | F28D 15/06 |
| | | | 126/590 |
| 4,893,476 A | 1/1990 | Bos et al. | |
| 5,445,213 A * | 8/1995 | Im | F25D 16/00 |
| | | | 165/10 |
| 5,497,629 A | 3/1996 | Rafalovich et al. | |
| 5,507,337 A | 4/1996 | Rafalovich et al. | |
| 5,755,104 A | 5/1998 | Rafalovich et al. | |
| 5,770,903 A | 6/1998 | Bland et al. | |
| 5,953,207 A * | 9/1999 | Aakalu | H05K 7/20163 |
| | | | 165/185 |
| 6,371,198 B1 * | 4/2002 | Hirano | F28D 20/0056 |
| | | | 126/617 |
| 6,668,567 B2 | 12/2003 | Levenduski et al. | |
| 6,701,914 B2 * | 3/2004 | Schwarz | F28D 20/0052 |
| | | | 126/400 |
| 8,443,868 B2 | 5/2013 | Barnwell | |
| 8,495,894 B2 | 7/2013 | Kerler et al. | |
| 9,719,688 B2 | 8/2017 | Holloway et al. | |
| 2002/0082747 A1 | 6/2002 | Kramer | |
| 2007/0175609 A1 | 8/2007 | Christ et al. | |
| 2008/0039979 A1 | 2/2008 | Bridges et al. | |
| 2008/0115911 A1 * | 5/2008 | Duesterhoeft | H02S 40/345 |
| | | | 165/104.21 |
| 2008/0167756 A1 | 7/2008 | Golden et al. | |
| 2010/0000707 A1 | 1/2010 | Tsubone et al. | |

FOREIGN PATENT DOCUMENTS

| | | | |
|---|---|---|---|
| DE | 2054057 A1 | 5/1972 | |
| DE | 2524393 A1 | 12/1976 | |
| DE | 4419887 A1 | 1/1995 | |
| DE | 29914113 U1 | 10/1999 | |
| DE | 20022367 U1 | 12/2001 | |
| DE | 10248064 A1 | 4/2004 | |
| EP | 0203501 A1 | 12/1986 | |
| EP | 0921365 A2 | 6/1999 | |
| EP | 0995963 A1 | 4/2000 | |
| EP | 0998869 A1 | 5/2000 | |
| EP | 2098807 A2 | 9/2009 | |
| EP | 2108910 A1 | 10/2009 | |
| GB | 1396292 | 6/1975 | |
| GB | 2280746 A | 2/1995 | |
| JP | S61265492 A | 11/1986 | |
| JP | H7091755 A | 4/1995 | |
| JP | 8-192619 A | 7/1996 | |
| JP | P2003106681 A | 4/2003 | |
| NL | 1018449 C2 | 1/2003 | |
| WO | 9516175 A1 | 6/1995 | |

OTHER PUBLICATIONS

Communication Pursuant To Article 94(3) EPC, EP Application No. 09 746 088.5-1602, EPO (dated Jun. 20, 2018).

Communication Pursuant To Article 94(3) EPC, EP Application No. 09 746 088.5-1602, EPO (dated Sep. 23,2016).

Communication Pursuant To Article 94(3) EPC, EP Application No. 09 746 088.5-1602, EPO (dated Nov. 9, 2015).

Communication Pursuant To Article 94(3) EPC, EP Application No. 09 746 088.5-1602, EPO (dated Apr. 13, 2015).

International Search Report, PCT/GB2010/051910, EPO (dated Apr. 11, 2012).

International Search Report, PCT/GB2009/050449, EPO (dated Nov. 12, 2009).

* cited by examiner

ENERGY STORAGE SYSTEMS

CROSS-REFERENCE TO RELATED APPLICATIONS

This application is a U.S. national phase application under the provisions of 35 U.S.C. § 371 of International Patent Application No. PCT/GB09/50449 filed Apr. 30, 2009, which in turn claims priority of United Kingdom Patent Application No. 0808930.2 filed May 16, 2008. The disclosures of such international patent application and United Kingdom priority patent application are hereby incorporated herein by reference in their respective entireties, for all purposes.

FIELD OF THE INVENTION

This invention relates to energy storage systems. More particularly, the present invention relates to thermal energy storage systems and use of energy storable material such as phase change material in the provision of heating and/or cooling systems in, for example, domestic dwellings.

BACKGROUND OF THE INVENTION

Although there are many heating and cooling systems on the market many of these prior art systems suffer from efficiency problems and are also expensive to run. Prior art systems also tend to be based on fossil fuels which are environmentally unfriendly.

Space heating ("heat") and hot water are an expected facility in homes, offices, factories, hotels, shops, etc around the world. Recent common practice has been to deliver this type of heating on-demand by burning storable energy sources (e.g. oil, gas and the like) or by using electrical energy (typically generated from gas or coal) in a heating element.

In most cities in the world, the storage of fuel takes place at centralised facilities (e.g. gas storage tanks; piles of coal at a power station) and is transferred via a distribution grid on-demand to the user (e.g. gas pipes, electricity lines etc.). Modern gas and oil condensing boilers convert oil and gas to heat at over 90% efficiency. Electrical elements operate at almost 100% efficiency. Superficially this looks better, however most electricity is generated from gas, oil or coal with only around 30% efficiency. So going back to the original fuel, electric heating is only around 30% efficient.

Typically the stored fuels (coal, oil, gas) are fossil fuels. These are convenient stores of "fossil sunlight." Their energy originates from the sun, via photosynthesis in plants which were ultimately trapped underground. They were laid down over millions of years but we are burning them in hundreds. As a result we face major problems in continuing to use these fossil fuels:

They will run out within foreseeable timeframes (ranging from decades for oil to centuries for gas and coal). Long before they reach depletion, once they pass their peak in production, prices rise rapidly.

Huge quantities of atmospheric $CO_2$ were sequestered in the ground during their formation. We are releasing this $CO_2$ back into the atmosphere at a hugely accelerated rate. The consequence is climate change with potentially catastrophic consequences in loss of both planetary biodiversity and human habitat (water shortages, desertification, and sea level rise).

There are many proposed methods to reduce and ultimately remove reliance on fossil fuels. In essence, they all seek to move the source of energy from ancient, fossil sunlight to current sunlight, with varying degrees of directness.

For heating and cooling applications, heat pumps can be used to move and concentrate naturally occurring or waste heat energy. To drive heat pumps requires electrical energy. Fossil-free energy sources driven from the sun include:

Photovoltaics that convert sunlight to electricity with efficiencies from under 10% to over 20% for cost-effective panels.

Solar thermal electricity generating plants concentrate sunlight to heat a working fluid which drives a generator. They must be located in areas of high direct sunlight, e.g. deserts. They are therefore only really suited to generating grid electricity.

Wind turbines harness winds which originate from solar energy driving the movement of air masses. It is rare that good wind resource exists at the point of use allowing co-location of generation and use.

Hydro electricity uses the gravitational potential energy of water running from high places to lower places. Except in very few parts of the world, hydro cannot provide the bulk of the demand for grid electricity. There are limited further sites to implement large reservoirs, and there can be human and bio-diversity issues around flooding large areas.

Wave power uses waves which are largely generated by action of the wind on the sea. In turn the wind is powered by the sun.

Bio-fuels: Wood can be burnt directly in thermal power stations the way coal is. A wide variety of feedstocks can be processed to make liquid or gaseous fuels. Whether using corn, rape-seed oil, saw grass, animal wastes or used cooking oil, the energy in them derives from current sunlight. However there are major concerns about competition between food and bio-fuel crop production, and between bio-fuel crops and naturally bio-diverse land (e.g. the elimination of jungle for palm oil).

It can be observed that apart from biofuels and some hydro, solar-driven renewables energy conversion devices do not operate on-demand (or in the jargon of the electricity generating industry, they are not "dispatchable"): their energy comes when the sun shines; when the wind blows; when seas are high. Energy available is statistically predictable at the scale of days, weeks, months or years; however electricity grids need to be balanced at the level of minutes, quarter or half hours.

Storing electrical energy is difficult. At present electricity grids include almost no storage—they are balanced in real-time. Hydro-electric reservoirs provide one opportunity to store electricity. When excess electricity is available on the grid, it can be used to pump water from a lower level to the higher reservoir, thus storing the electrical energy in the form of gravitational potential energy in the water that was moved uphill. When the grid is short of electricity this water can be allowed to flow down through the turbines and re-generated into electricity. This process is 90% efficient, but suitable pumped-storage hydro sites are scarce.

Another approach, proposed as an application of the current invention, is to convert surplus electrical energy from intermittent renewable sources into heat or cool when the electricity is available, store the heat or cool in a thermal store and then make it available as useful heat and cool on demand.

Thermal energy storage technologies store heat, for example from active solar collectors, in an insulated repository for later use in space heating, domestic or process hot water, or to generate electricity. Most practical active solar heating systems have storage for a few hours to a day's worth of heat collected. There are also a small but growing number of seasonal thermal stores, used to store summer heat for use during winter.

Phase change materials have previously been employed in energy storage devices using the solid-liquid phase change. The liquid-gas phase change material is usually not practical for use as thermal storage due to the large volumes or high pressures required to store the materials when in their gas phase.

Initially, the solid-liquid phase change materials perform like conventional storage materials; their temperature rises as they absorb heat. Unlike conventional storage materials, however, when phase change materials reach the temperature at which they change phase (their melting point) they absorb large amounts of heat without a significant rise in temperature. When the ambient temperature around a liquid material falls, the phase change material solidifies, releasing its stored latent heat. Within the human comfort range of 20° to 30° C., some phase change materials are very effective. They can store about 5 to 14 times more heat per unit volume than conventional storage materials such as water, masonry, or rock.

Phase change materials can be broadly grouped into two categories: organic compounds (such as waxes, vegetable extract, polyethylene glycol); and salt-based products (such as Glauber's salt). The most commonly used phase change materials are salt hydrates, fatty acids and esters, and various paraffins (such as octadecane). Recently, also ionic liquids were investigated as phase change materials. As most of the organic solutions are water free, they can be exposed to air, but all salt based phase change materials solutions must be encapsulated to prevent water evaporation. Both types offer certain advantages and disadvantages for certain applications.

Eutectic salts, a class of phase change materials, have also been used since the late 1800s as a medium for thermal storage applications. They have been used in such diverse applications as refrigerated transportation for rail and road applications and their physical properties are, therefore, well-known.

The temperature ranges offered by phase change material technology provides a new horizon for building services and refrigeration engineers regarding medium and high temperature energy storage applications. The scope of these thermal energy applications are wide ranging such as solar heating, hot water, heating rejection, air conditioning and thermal energy storage applications.

However, there are a number of problems with practical use of phase change materials including achieving suitable rates of heat transfer in and out and acceptable levels of thermodynamic efficiency.

It is an object of at least one aspect of the present invention to obviate or at least mitigate one or more of the aforementioned problems.

It is a further object of the present invention to provide an improved thermal energy store.

It is a further object of the present invention to provide an improved heating and/or cooling system comprising phase change material.

SUMMARY OF THE INVENTION

According to a first aspect of the present invention there is provided a heating and/or cooling system comprising:

a thermal energy source; and a series of banks containing thermal energy storage material;

wherein the thermal energy storage material in the series of banks is capable of storing and/or releasing energy at different temperatures.

The heating and/or cooling system may form part of or may include within it a thermal energy store.

According to a second aspect of the present invention there is provided a thermal energy store capable of accepting and/or storing and/or releasing thermal energy at a range of one or more temperatures to/from at least one thermal energy source and/or sink, said thermal energy store comprising:

a configuration of one or more thermal energy storage banks, each of said thermal energy storage banks having an operating temperature range;

at least one or more of the thermal energy storage banks capable of containing an appropriate amount and type of thermal energy storage material comprising a single material or a mixture of materials;

wherein said thermal energy storage material in at least one bank contains at least some of one or more types of thermal energy storage material that undergoes at least one energy absorbing and/or releasing phase transition at one or more temperatures or one or more sub-ranges of temperatures within the usual operating temperature range of each bank; and wherein each phase transition is associated with a change in the physical and/or chemical properties of said thermal energy storage material.

In preferred embodiments, at least one or all of the phase transitions may be reversible without substantial loss of energy absorbing and/or storing and/or releasing capacity across at least more than one reversible cycle or cycles.

Typically, the heat storage (i.e. thermal energy storage) material may undergo a solid-liquid phase change and may store/release energy on undergoing a phase change. This process may occur a plurality of times.

The present invention therefore relates to a thermal energy store and resulting thermal energy storage. The technology described in the present invention may be used in a number of technologies that store energy in, for example, a thermal reservoir for later re-use. A particular advantage of using solid-liquid phase change material as set out in the present invention is to balance energy demand between day time and night time. A thermal reservoir may be maintained at a temperature above (i.e. hotter) or below (i.e. colder) than that of the ambient environment. The present invention can therefore be used in both a heating and/or a refrigeration system. A particular use of the present invention is in air conditioning units or in central heating systems.

Typically, the thermal energy store may comprise at least one bank or a plurality of banks. The at least one or plurality of banks may contain one or more heat exchanger means that may permit thermal energy to be transferred (e.g. by conduction and/or radiation and/or convection and/or heat pipe and/or thermal energy transfer indirectly via a thermal energy transfer fluid and/or any other means of thermal energy transfer) to and/or from at least one thermal energy sources and/or sinks.

The heat exchanger means in at least one bank may permit thermal energy to be simultaneously or substantially simultaneously transferred (and, for example, with the same heat exchanger means, also on other occasions, non-simultaneously transferred) to and/or from two or more thermal energy sources and/or sinks.

The heat exchanger means in at least one bank may permit thermal energy to be simultaneously (and, for example, with the same heat exchanger means, also on other occasions, non-simultaneously and/or simultaneously only in relation to some subset of the possible set of thermal energy sources/sinks) transferred to and/or from three or more thermal energy sources/sinks.

In particular embodiments, the number of potentially simultaneous thermal energy sources and/or sinks may be four or more, five or more, six or more, seven or more, eight or more, nine or more, or ten or more. There may therefore be a plurality of thermal energy sources and/or sinks.

There may therefore be multiple sources with varying temperatures.

In particular embodiments, the thermal store may comprise two or more banks, three or more banks, four or more banks, five or more banks, six or more banks, seven or more banks, eight or more banks, nine or more banks, or ten or more banks. There may therefore be a plurality of banks.

Typically, the thermal store and/or each bank and/or a plurality of banks may be capable of accepting and/or storing and/or releasing thermal energy at a range of one or more temperatures to and/or from one or more thermal energy sources and/or sinks simultaneously or at different times.

At least one or all of the banks in the thermal store may be nested. Typically, a configuration of banks may be wholly and/or partially nested within one another.

At least one of the one or more outer banks (meaning, without considering any interposing insulation, being entirely and/or mostly surrounded by one or more local environments external to the thermal energy store and meaning not being enclosed substantially and/or at all by any other bank) may be at or substantially near the temperature of the one or more local environments enclosing the thermal energy store.

The one or more hottest banks (meaning, for example but not limited to, the bank having a phase transition temperature and/or current average and/or maximum and/or minimum temperature of its thermal energy storage material which is the highest in absolute terms from the set of all banks within the thermal energy store and/or represents a local maximum) may be at least one of the one or more innermost nested banks (meaning that bank or those banks for which no other bank is wholly and/or mostly enclosed within it/them).

The one or more coldest banks (meaning, for example but not limited to, the bank having a phase transition temperature and/or current average and/or maximum and/or minimum temperature of its thermal energy storage material which is the lowest in absolute terms from the set of all banks within the thermal energy store and/or represents a local minimum) may be at least one of the one or more innermost nested banks (meaning that bank or those banks for which no other bank is wholly and/or mostly enclosed within it/them).

The thermal energy store may include at least one coldest bank and one hottest bank, each of which may be an innermost bank.

Typically nesting, and/or wholly and/or partially enclosing banks within one another, may reduce the thermal energy lost from the thermal energy store to its one or more surrounding local environments compared to the case where no nesting is used.

In particular embodiments, at least one thermal energy sources/sinks may be external to the thermal store. At least one thermal energy source/sink may be within at least one bank of the thermal energy store.

Typically, the thermal energy store may comprise at least one thermal energy transfer connection between at least one thermal energy source and one thermal energy sink.

The thermal energy store may comprise at least one thermal energy transfer connection between at least one thermal energy source/sink within the thermal store and at least one thermal energy sink/source external to the thermal store.

The thermal energy store may comprise at least one thermal energy transfer connection between at least one thermal energy source/sink within at least one first bank of the thermal store and at least one thermal energy sink/source within at least one second bank of the thermal store.

Typically, any thermal energy source/sink within a bank comprises at least some thermal energy storage material in thermal contact (whether directly physically in contact or radiatively in thermal contact or otherwise) with the one or more heat exchanger means within the bank. The heat exchanger means may permit thermal energy to be removed from and/or delivered to (by conduction and/or radiation and/or convection and/or heat pipe and/or thermal energy transfer indirectly via a thermal energy transfer fluid and/or any other means of thermal energy transfer) the thermal energy storage material within the bank by transfer to/from at least one thermal energy transfer connection comprising at least one thermal energy transfer medium (including but not limited to thermally conductive metal and/or high thermal conductivity plastic and/or gas and/or refrigerant and/or electromagnetic radiation and/or liquid and/or other heat transfer fluid).

The at least one thermal energy transfer connection comprising at least one thermal energy transfer medium permits thermal energy to be transferred from/to at least one thermal energy source/sink external to the thermal store which is in thermal contact (whether directly physically in contact or radiatively in thermal contact or otherwise) with the at least one thermal energy transfer connection.

The thermal energy transfer medium of the thermal energy transfer connection may be contained within and/or enclosed by and/or directed by one or more pipes and/or other vessels and/or enclosures (which may be closed and/or open, and may be point-to-point in nature and/or form a loop and/or form all or part of a network) to promote and/or assist and/or ensure the thermal energy transfer medium's function to transfer thermal energy from the thermal energy source at one end of the thermal energy transfer connection to the thermal energy sink as the thermal energy transfer medium may be pumped and/or otherwise caused to move by the application of external energy and/or by natural processes (such as but not limited to convection and/or thermosyphoning and/or capillary action) in such a way as to promote and/or assist and/or ensure its function to transfer thermal energy from the thermal energy source at one end of the thermal energy transfer connection to the thermal energy sink at the other or vice-versa.

Typically, at least one thermal energy transfer connection may comprise and/or include a heat pipe or a pipe circuit containing heat transfer fluid driven by a pump.

Thermal energy may be caused to move within and/or through the thermal energy transfer connection by the application of external energy (such as but not limited to heat pumping and/or thermoelectric effects and/or thermionic emission) and/or by natural processes (such as but not limited to convection and/or thermosyphoning and/or capillary action) in such a way as to promote and/or assist and/or ensure the thermal energy transfer medium's function to transfer thermal energy from the thermal energy source at one end of the thermal transfer connection to the thermal energy sink at the other or vice-versa.

The thermal energy transfer connection may comprise and/or incorporate one or more devices for transferring heat from a lower temperature body to a higher temperature body wherein such devices may include, but are not limited to:
  a vapour compression heat pump;
  and/or chemical heat pump;
  and/or thermoelectric device;
  and/or thermionic device;
  and/or any other device capable of moving heat from a lower temperature body to a higher temperature body operating within the laws of thermodynamics.

The thermal store may incorporate integrally within its function and/or structure and/or control logic one or more devices for transferring heat from a lower temperature body to a higher temperature body wherein such devices may include, but are not limited to:
  a vapour compression heat pump;
  and/or chemical heat pump;
  and/or thermoelectric device;
  and/or thermionic device;
  and/or any other device capable of moving heat from a lower temperature body to a higher temperature body operating within the laws of thermodynamics.

The heating and/or cooling system may incorporate integrally within its function and/or structure and/or control logic one or more devices for transferring heat from a lower temperature body to a higher temperature body wherein such devices may include, but are not limited to:
  a vapour compression heat pump;
  and/or chemical heat pump;
  and/or thermoelectric device;
  and/or thermionic device;
  and/or any other device capable of moving heat from a lower temperature body to a higher temperature body operating within the laws of thermodynamics.

The thermal energy transfer connection may link two or more banks and may comprise and/or incorporates one or more devices for transferring heat from a lower temperature body to a higher temperature body wherein such devices may include, but are not limited to:
  a vapour compression heat pump;
  and/or chemical heat pump;
  and/or thermoelectric device;
  and/or thermionic device;
  and/or any other device capable of moving heat from a lower temperature body to a higher temperature body operating within the laws of thermodynamics.

The ability to transfer thermal energy of a thermal energy transfer connection and/or a part of a thermal energy transfer connection and/or heat exchanger means within a bank connected to such a thermal energy transfer connection and/or heat exchanger means external to the thermal energy store connected to such a thermal energy transfer connection may be modulated between a state in which it is maximally resistant to and/or completely incapable of transferring thermal energy and a state in which it is at its minimal resistance to transferring thermal energy and/or modulated to any degree of permissiveness between the minimum and maximum levels.

Changes of thermal permissiveness may be accomplished by, for example, but not limited to, varying the amount of motivating energy, whether electrical or otherwise, applied to a pump and/or a heat pump and/or thermoelectric device and/or other apparatus, and/or by varying the rate of flow of a thermal energy transfer fluid, and/or by selecting from the available set of channels and/or pipes capable of carrying thermal energy transfer fluid through heat exchange means and/or thermal energy transfer connections a subset that are at a specific moment opened to carry thermal energy transfer fluid using, for example, but not limited to, valves and/or motor-driven valves and/or manifolds and/or solenoids.

Change of thermal permissiveness may occur by changes to the physical configuration of the structure of the heat exchanger and/or thermal energy transfer connection means and/or the thermal energy transfer fluid in response to, for example, but not limited to, the physical state of the thermal store and/or some part of the thermal store, and/or the physical state of the environment surrounding the thermal store and/or some other stimulus, for instance, but not limited to, temperature changes at either end of a thermosyphon or heat pipe switching on or off and/or modulating its ability to transfer thermal energy, and/or a specially designed heat pipe with a reservoir for its thermal energy transfer fluid having that reservoir opened and/or closed, and/or a bi-metallic strip acting in response to a temperature change to open and/or close a valve.

The modulation may be controlled and/or influenced by, for instance, but not limited to, user stimulus and/or the action of a thermostat and/or mechanical and/or electrical controller and/or control program running on a programmable computation system, responding in turn to the physical state of the thermal store and/or some part of the thermal store, and/or the physical state of the environment surrounding the thermal store.

At least some of the banks may have overlapping and/or identical usual operating temperature ranges.

At least some of the banks may have distinct, non-overlapping usual operating temperature ranges.

At least two banks and/or at least one bank and at least one external thermal energy source/sink may be connected by at least one thermal energy transfer connection constituting a network and/or directed graph wherein the banks may constitute nodes and the thermal energy transfer connections may constitute edges.

At least one thermal energy transfer connection, may transfer thermal energy in only one direction and/or can transfer with much higher permissiveness in one direction and very low permissiveness in the other (for example, but not limited to, from a first bank to a second bank, only when at that moment the thermal energy storage material within the first bank is at a temperature higher than the thermal energy storage material within with the second bank, but never from said second bank to said first bank).

One or more single-direction-only thermal energy transfer connections may comprise and/or include, for instance, but not limited to, heat diodes and/or specially configured heat pipes and/or thermosyphons, and/or pumped circuits operating only when thermostats and/or thermocouples in the banks and/or thermal energy sources/sinks at either end of report a temperature higher at one end than at the other but not when the temperature difference goes the other way, and/or selective emissivity surfaces and/or selective emissivity glass and/or double glazing and/or triple glazing and/or inert gas and/or vacuum.

Every external heat source/sink may be directly connected by thermal energy transfer connection means to every bank within the thermal store.

Every bank within the thermal store may be connected to every other bank within the thermal energy store by thermal energy transfer connection means.

For at least one external thermal energy source/sink it may be connected to at least one bank within the thermal energy store but it may not be connected to every bank within the thermal energy store.

For at least one bank within the thermal store it may be connected to at least one other bank within the thermal energy store but it may not be connected to every other bank within the thermal energy store.

Every bank within the thermal store may be connected to only the next bank hotter/colder than the given bank, wherein the temperature of each bank means, for example, but not limited to, phase transition temperature of thermal storage material within each bank, and/or the minimum and/or maximum and/or centre of each bank's usual operating temperature range.

At least one thermal energy source external to the thermal energy store and/or at least one source bank within the thermal energy store may lack a direct thermal energy transfer connection to/from at least one destination bank within the thermal energy store and/or at least one thermal energy sink external to the thermal energy store. Thermal energy can still be transferred between the source and destination (or vice-versa) by utilising as a substitute for the missing direct thermal energy transfer connection at least a sequence of a first thermal energy transfer connection leading to a first intermediate bank followed by a second thermal energy transfer connection leading to the original destination.

Transfer of thermal energy from the source using the first thermal energy transfer connection causes the thermal energy to be added to the energy stored in the at least one intervening bank, where it may be stored temporarily. Simultaneously and/or previously and/or later thermal energy may be removed from the said intervening bank and transferred using the second thermal energy transfer connection to the destination.

The sequence of intermediate transfers may include at least two intermediate banks and at least three thermal energy transfer connections.

At least three sources/destinations for thermal energy transfers (i.e. sources/sinks external to the thermal energy store and/or source/destination banks within the thermal energy store) may share a single thermal energy transfer connection.

The thermal energy transfer connection may be shared by virtue of being continuously connected to the heat exchangers of each of the at least three sources/destinations.

The thermal energy transfer connection may be shared at some times by virtue of being on at least some occasions connected to the heat exchangers of at least two of the at least three sources/destinations.

One or more thermal energy storage banks may be connected to another set of one or more thermal energy storage banks by thermal energy transfer connection means wherein said means may permit the controlled and/or deliberate and/or uncontrolled transfer of thermal energy between banks.

The thermal energy transfer connections between banks may be changed during the use of the system by, for example but not limited to, physically making and/or breaking pipework and/or other connections, and/or by switching on and/or off and/or into intermediate positions valves and/or pumps and/or heat pumps and/or other switchable and/or controllable elements and/or by changing the ability to transfer thermal energy of heat pipes and/or any other means of controlling heat transfer known to the art.

In aspects of the invention, a source may at another time and/or at the same time also be a destination In particular embodiments, the sources and/or destinations of thermal energy transfers may be switched in succession and/or in parallel amongst one or more thermal energy sources/sinks (whether external to a thermal energy store and/or thermal energy storage banks within a thermal energy store) and one or more thermal energy storage banks of a thermal energy store.

The switching of sources/destinations may result from physical changes to properties (for example, but not limited to temperature) of the system and/or the environment surrounding the system and/or the component parts of the system (such as, but not limited to, thermal energy storage banks and/or thermal energy sources/sinks) causing natural physical changes to some element of the system (for example, but not limited to, expansion of a metal and/or variable expansion of a bi-metallic strip, and/or density change and/or evaporation and/or condensation of a thermal energy transfer fluid) that may result in change to the function of some part of the system (such as, but not limited to, opening and/or closing and/or variation of the state of a valve, and/or variation of the ability of a heat pipe to transmit heat) wherein such changes were intended by a system designer.

A control system may choose and/or switch the sources and/or destinations of thermal energy transfers in succession and/or in parallel amongst one or more thermal energy sources/sinks (whether external to a thermal energy store and/or thermal energy storage banks within a thermal energy store) and one or more thermal energy storage banks of a thermal energy store.

At regular and/or at irregular intervals of time, the control system may calculate the relative overall system coefficient of performance and/or efficiency and/or any other performance metric for one or more potential thermal energy transfers at any time and the control system may choose a more beneficial or the most optimal choice of such transfers in relation to parameters set by an over-arching control system and/or according to criteria established by the thermal energy storage system designer and/or user and/or purchaser and/or legal criteria and/or safety criteria and/or any other design and/or usage and/or benefit criteria, and switch the sources and/or destinations accordingly.

The amount and/or temperature of thermal energy available from/acceptable by a thermal energy source/sink external to the thermal energy store may be variable over time.

The amount and/or temperature of thermal energy available from/acceptable by a thermal energy source/sink external to the thermal energy store may be variable over time due to user choices, for example but not limited to:

the decision of a user to light and/or not light and/or increase/decrease the fuel flow rate to and/or increase/decrease the oxidiser flow rate to and/or extinguish a source of combustion, for example but not limited to, the burning of wood and/or natural gas;

and/or the decision of a user to deploy a solar panel and/or modify its position to increase and/or decrease its ability to capture sunlight and/or service it to remove dirt; and/or the decision of a user to switch on and/or off a pump causing cold lake water to be available at an external heat exchanger as a thermal energy sink.

The amount and/or temperature of thermal energy available from/acceptable by a thermal energy source/sink external to the thermal energy store may be variable over time due to the process of operation of the thermal energy source, for example but not limited to:

the warming up phase of a combustion burner; and/or the ability and/or inability and/or accuracy and/or responsiveness of a solar panel to track the sun as it traverses across the sky, and/or self-limiting and/or imposed limitation of performance of an external heat pump due to limits on available electrical energy, and/or the exhausting of the capacity of a reservoir of thermal energy (such as, but not limited to, a tank of waste warm water and/or a block of ice) to release/accept thermal energy.

The amount and/or temperature of thermal energy available from/acceptable by a thermal energy source/sink external to the thermal energy store may be variable over time due to intrinsic or natural variability of the source/sink itself, for example but not limited to:

variability in the quality of a fuel, for example but not limited to, the quality of and/or moisture content of firewood and/or the volumetric energy content of natural gas and/or biogas; and/or the rising/setting of the sun and/or the increase/decrease of the sun's height above the horizon and/or the traverse of the sun across the sky with changing angle relative to the surface of a solar panel and/or the occlusion and/or partial occlusion of the sun's rays falling on a solar panel due to clouds and/or shadows; and/or naturally occurring changes in air temperature and/or water temperature and/or the change of temperature of a body that constitutes a thermal energy source as it tends towards achieving equilibrium temperature with an environment surrounding it.

At least some sources and/or destinations of thermal energy transfers may be switched in succession and/or parallel such that at least at some times thermal energy may be transferred from one external source of thermal energy to a selected bank that has at said times a lower average and/or maximum and/or minimum temperature in its thermal energy storage material than the temperature at said times of the external source of thermal energy.

On at least some occasions, the selected bank may be chosen because it is, at that time, the hottest bank (i.e. that bank having the highest average and/or maximum and/or minimum temperature of its thermal energy storage material) amongst all banks of the thermal energy store that have temperatures lower than the external thermal energy source.

On at least some occasions, the selected bank may be chosen because it is, at that time, the bank most depleted in thermal energy by some measure, for example, but not limited to the bank having the lowest average and/or maximum and/or minimum temperature of its thermal energy storage material, and/or wherein the thermal energy storage material may be a phase change material being the closest (whether on an absolute measure and/or proportional to the maximum possible for that bank) to being entirely in its lowest energy state, for example but not limited to, frozen.

After and/or at the same time as thermal energy is transferred from the external thermal energy source to the selected bank, potential to transfer thermal energy to other banks in the thermal energy store may remain, and a further bank and/or banks may be selected to accept some and/or all of the remaining thermal energy that could be potentially transferred in sequence and/or at the same time by, for example, but not limited to, causing a thermal transfer fluid (that has already been directed by one thermal energy transfer connection from the external thermal energy source to a first bank) to be further directed by an arrangement of one or more additional thermal energy transfer connections in sequence to heat exchanger means in one or more additional banks, wherein the one or more additional banks are visited in descending sequence of average and/or maximum and/or minimum temperature of the thermal energy storage material within each bank.

At least some sources and/or destinations of thermal energy transfers may be switched in succession and/or parallel such that at least at some times thermal energy is transferred to one external sink of thermal energy from a selected bank that has at said times a higher average and/or maximum and/or minimum temperature in its thermal energy storage material than the temperature at said times of the external sink of thermal energy.

On at least some occasions, the selected bank may be chosen because it is, at that time, the coldest bank (i.e. that bank having the lowest average and/or maximum and/or minimum temperature of its thermal energy storage material) amongst all banks of the thermal energy store that have temperatures higher than the external thermal energy sink.

On at least some occasions, the selected bank may be chosen because it is, at that time, the bank containing the largest quantity of thermal energy by some measure, for example, but not limited to the bank having the highest average and/or maximum and/or minimum temperature of its thermal energy storage material, and/or wherein the thermal energy storage material may be a phase change material being the closest (whether on an absolute measure and/or proportional to the maximum possible for that bank) to being entirely in its highest energy state, for example but not limited to, molten.

After and/or at the same time as thermal energy may be transferred to the external thermal energy sink from the selected bank, potential to transfer thermal energy from other banks in the thermal energy store remains, and a further bank and/or banks may be selected to provide some and/or all of the remaining thermal energy that could be potentially transferred in sequence and/or at the same time by, for example, but not limited to, causing a thermal transfer fluid to be first directed by an arrangement of one or more additional thermal energy transfer connections in sequence to heat exchanger means in one or more additional banks, wherein the one or more additional banks may be visited in descending and/or ascending sequence of average and/or maximum and/or minimum temperature of the thermal energy storage material within each bank before it is directed by a final thermal energy transfer connection to the external thermal energy sink from the last bank.

Thermal energy transfer fluid may flow around a circuit that may include an external source/sink of thermal energy and at least one bank of a thermal energy store selected from the full set of such banks.

The number and/or order and/or phase transition temperature and/or current average and/or maximum and/or minimum temperature of banks to include in the transfer of thermal energy from/to an external source/sink may be chosen such that the return temperature of any thermal energy transfer fluid that may flow back from the thermal energy store may be better adapted to and/or optimally matched to some characteristic of the external source/sink, for example, but not limited to, the temperature at which thermal energy transfer fluid flowing into the external source/sink may deliver and/or collect and/or reject and/or generate and/or convert thermal energy most optimally, for example, but not limited to:

returning thermal energy transfer fluid to a solar thermal panel during the day at a low temperature so that radiative losses from the panel are minimised and therefore the solar panel operates as efficiently as possible to collect heat; and/or returning thermal energy transfer fluid to a solar thermal panel during the night; and/or a radiator at a high temperature so that radiative losses from the panel and/or radiator are maximised and therefore the solar panel operates as efficiently as possible to reject heat and/or returning thermal energy transfer fluid to a gas boiler within the design temperature range for which its operation is designed and rated to be most efficient; and/or returning thermal energy transfer fluid to a back boiler in a wood-burning stove at a temperature whereby the thermal energy transfer fluid will not boil and whereby the structure of the stove will not crack due to thermal stress.

The objective to better and/or optimally match some characteristic of the external source/sink is balanced against the objective to maintain certain target quantities of, for example but not limited to, thermal energy in each bank and/or certain target temperatures, which may be changed from time-to-time, by changing from time-to-time the number and/or order and/or phase transition temperature and/or current average and/or maximum and/or minimum temperature of banks to include in the thermal energy transfers between the thermal energy store and at least one external sources/sinks.

The objective to maintain and/or achieve certain target quantities of, for example but not limited to, thermal energy in each bank and/or certain target temperatures, which may be changed from time-to-time, may be achieved by a control system adapting the thermal energy transfers within and to/from the store.

Such adaptation may be performed having reference to current and/or historical information and/or future-looking projections about physical parameters and/or user behaviour related to the thermal energy store itself and/or its banks and/or its thermal energy storage materials, and/or the environment immediately surrounding the thermal energy store, and/or the demand patterns of any services supplied by the thermal energy store (for example, but not limited to, the schedule of production of a factory using such thermal energy), and/or the wider environment (for example, but not limited to, current/projected outdoor temperature and/or solar insolation and/or cloud cover and/or projected and/or actual availability of fuel and/or electrical energy), and/or user behaviour (for example, but not limited to, user presence or absence and/or user preferences for comfort temperature).

The external source of thermal energy may be a fluid and/or environment containing waste and/or excess thermal energy from a process (for example, but not limited to, exhaust warm air from a building in a cold environment and/or exhaust cool air from a building in a warm environment and/or waste warm water from bathing and/or showering and/or oil in a heat engine requiring cooling before re-use and/or cooling fluid from a fuel cell and/or a biogas digester and/or a bio-fuel production plant).

The external source of thermal energy may be a fluid and/or environment containing waste and/or excess thermal energy and this thermal energy may be transferred to at least one bank that may be chosen specifically for having a phase transition temperature of its thermal energy storage material that makes it well adapted to absorbing the waste thermal energy.

There may exist, from the at least one bank that absorbs waste and/or excess thermal energy, no direct thermal energy transfer connections to thermal energy sinks/sources external to the thermal energy store (apart from the one or more thermal energy transfer connections to the waste and/or excess thermal energy source).

There may exist, from the at least one bank that absorbs waste and/or excess thermal energy, at least one thermal energy transfer connection (specifically including those where machines are used to transfer thermal energy from lower to higher temperature) to at least one other banks within the thermal energy store.

The effect may be to capture waste and/or excess heat from a fluid and/or environment at a temperature below that at which such waste/excess heat could usefully directly contribute to a useful service of the thermal energy system and to effect such capture at an energy transfer rate that is adapted to the availability of waste/excess heat into one or more banks containing thermal energy storage materials at temperatures below those at which waste/excess heat could usefully directly contribute thermal energy to a useful service of the thermal energy system and to use devices (for example but not limited to heat pumps) to transfer thermal energy from these one or more lower temperature banks to one or more higher temperature banks (which are at temperatures from which they can usefully directly contribute thermal energy to a useful service of the thermal energy system) at a rate that may differ substantially from the waste/excess energy capture rate.

The rate of thermal energy transfer from lower to higher temperature banks may be lower than the peak rate at which thermal energy transfers to the lower temperature banks from the waste/excess energy sources.

On at least some occasions thermal energy may be removed from at least one bank and delivered to at least one other bank of the thermal energy store, and at the same time no thermal energy may be added to and/or removed from the thermal energy store from/to any thermal energy source/sink external to the thermal energy store.

The configuration of the system may be such that it may be possible that on at least some occasions thermal energy may be removed from at least one bank and delivered to at least one other bank of the thermal energy store, and at the same time no thermal energy is added to and/or removed from the thermal energy store from/to any thermal energy source/sink external to the thermal energy store.

As a result of actions dictated by at least one control system and/or by design of the system the amount of thermal energy added to each bank may be kept in perfect balance with the amount of thermal energy removed from each bank (including any lost by unwanted and/or unintended thermal transfers and/or other losses) over a cycle which may be of any duration, for example but not limited to, some seconds and/or some minutes and/or one hour and/or several hours and/or one day and/or several days and/or one week and/or several weeks and/or one month and/or several months and/or one year and/or several years.

One or more thermal energy transfer fluids may be re-routed and/or re-cycled through and/or via heat exchangers in thermal contact with a configuration of banks in an order intended and/or selected from time-to-time to maximise and/or enhance the thermal energy extracted from the thermal energy transfer fluid and stored into the thermal energy storage material of the banks and/or extracted from the thermal energy storage material of the banks and transferred into the thermal energy transfer fluid.

The physical configuration of the thermal energy store may be changed during the use of the system by any of the following:

adding one or more extra banks to the thermal energy store; and/or removing one or more banks from the thermal energy store; and/or exchanging one or more banks for replacement banks.

During use and/or between uses the addition and/or connection to the thermal energy store of one or more banks may add further stored thermal energy to the thermal energy store wherein such additional thermal energy results from:

the one or more additional banks being created in a manufacturing process external to the thermal energy store which manufacturing process itself imbues the thermal energy storage material within the one or more additional banks with thermal energy suitable for later release via a phase transition; and/or the one or more additional banks being created in a manufacturing process external to the thermal energy store and later, but before being added to the current thermal energy store, absorbed thermal energy in another thermal energy store and/or within other equipment designed to add thermal energy to the thermal energy storage material of the one or more additional banks.

During use or between uses the thermal energy storage material in one or more thermal energy storage banks may be added to and/or exchanged wholly and/or partially by replacement thermal energy storage material.

The exchange of and/or addition to the thermal energy storage material of one or more banks adds further thermal energy to the one or more banks wherein:

the additional and/or replacement thermal energy storage material was made in a manufacturing process external to the thermal energy store which manufacturing process itself imbued the additional and/or replacement thermal energy storage material with thermal energy suitable for later release via a phase transition; and/or the additional and/or replacement thermal energy storage material absorbed thermal energy in another thermal energy store and/or within other equipment designed to add thermal energy to the additional and/or replacement thermal energy storage material.

Heat may be allowed to flow in a controlled and/or an uncontrolled way from one or more banks at a higher temperature to one or more banks at a lower temperature, and/or from one or more banks at a higher temperature to one or more ambient environments in thermal contact with the thermal store, and/or from the one or more ambient environments in thermal contact with the thermal store to one or more banks at a lower temperature, by means of conduction and/or radiation and/or convection and/or heat pipe and/or transfer through a thermal transfer fluid and/or any other known physical mechanism of heat transfer.

One or more banks may be equipped with insulation means to:

promote thermal isolation between one or more banks and one or more other banks and/or one or more banks and one or more ambient environments in thermal contact with the thermal store and/or one or more banks of the thermal store; and/or to eliminate to the greatest extent possible and/or restrict and/or limit and/or selectively control heat allowed to flow from one or more banks at a higher temperature to one or more banks at a lower temperature, and/or from one or more banks at a higher temperature to the one or more ambient environments in thermal contact with the thermal store, and/or from the one or more ambient environments in thermal contact with the thermal store to one or more banks at a lower temperature, by means of conduction and/or radiation and/or convection and/or heat pipe and/or transfer through a thermal transfer fluid and/or any other known physical mechanism of heat transfer.

One or more banks may be physically separated from one or more other banks of the same thermal energy store.

Physically separated banks may be controlled by the control system as part of the same thermal energy store.

Thermal energy transfers may be possible between said physically separated banks and one or more other banks of the same thermal energy store.

The system of the present invention may be used as a heating system and/or to provide a heating service (wherein the system may be used to add heat to at least one body and/or at least one environment external to the thermal energy store).

The system of the present invention may be used as a cooling system and/or to provide a cooling service (wherein the system is used to remove heat from at least one body and/or at least one environment external to the thermal energy store).

The system of the present invention may be used as a combined heating and cooling system used at the same and/or at different times as both a cooling system and a heating system and/or to provide at different and/or the same times heating and/or cooling services (wherein the system is used to add heat to at least one body and/or at least one environment external to the thermal energy store and, at the same and/or different times, is used to remove heat from at least one body (which may be a different and/or the same body) and/or at least one environment (which may be a different and/or the same environment) external to the thermal energy store).

The heating and/or combined system and/or service may be used as a central and/or distributed space heating system (for example, but not limited to use in, a building and/or a vehicle and/or an outdoor space).

The heating and/or combined system and/or may be used for water heating (for example, but not limited to use in, heating clean water for washing and/or bathing and/or cooking and/or drinks preparation and/or swimming pool heating).

The heating and/or cooling and/or combined system and/or service may be used for heating and/or cooling thermal energy transfer fluids to provide industrial process-heat and/or cooling, and/or directly and/or indirectly heating and/or cooling working fluids of an industrial process.

The heating and/or cooling and/or combined system and/or service may be used for heating heat-transfer fluids for use in a machine that converts thermal energy and/or temperature differences into electrical and/or mechanical energy (for example, but not limited to, a steam piston and/or a Stirling engine and/or Rankine cycle engine and/or steam turbine, whether on its own and/or attached to an electric alternator and/or dynamo, and/or a thermoelectric and/or thermionic device used as an electrical generator).

The cooling and/or combined system and/or service may be used as a central and/or distributed space cooling and/or air conditioning system (for example, but not limited to use in, a building and/or a vehicle and/or an outdoor space).

The cooling and/or combination system and/or service may be used as a refrigeration system (for example, but not limited to use in, a domestic refrigerator and/or freezer, and/or commercial and/or industrial chilled and/or frozen storage and/or temperature controlled storage, such as but not limited to, a potato store, and/or cryogenic system).

The thermal energy transfer fluid of the heating and/or cooling and/or combined system and/or service may be a liquid (for example, but not limited to, water and/or water-glycol mixture and/or water with other additives and/or a flowable oil) and/or a refrigerant (for example, but not limited to, butane and/or propane and/or ammonia and/or R-12 and/or R-22 and/or R-134a) and/or a gas (for example, but not limited to, air).

At least one bank of the thermal energy store may be used as a thermal store for at least one heating and/or cooling and/or combined service.

At least one bank of the thermal energy store may be used as a thermal store for at least one service that may be used at least some of the time for heating and the same service may be used at least some of the time for cooling.

At least one bank may be greatly increased in size to act as a bulk thermal energy reservoir for at least one service.

The at least one service may be space heating and/or cooling delivered through (for example, but not limited to) radiant walls and/or under-floor heating and/or radiant ceilings and/or chilled beams and/or radiators and/or over-sized radiators and/or fan-coil radiators and/or air handling systems.

At least one bank and/or at least one sub-parts of at least one bank of the thermal energy store may be physically co-located with and/or close to the point of delivery of the service for which it is a thermal energy reservoir and is selected to have a usual operating temperature range and/or ranges suitable to directly drive said service (for example but not limited to, one or more banks distributed at one or more taps where hot water is drawn in a domestic hot water system and/or one or more radiators and/or areas of radiant wall and/or ceiling and/or under-floor heating comprising parts of one or more banks directly in radiative and/or conductive and/or convective exchange with the one or more environments and/or bodies to be heated/cooled).

The system may be used inside domestic and/or commercial and/or industrial appliances and/or machinery, for example but not limited to, a dishwasher, washing machine, etc; a hot drinks machine that also delivers chilled water and/or cold drinks; a hot/cold vending machine for food and/or drinks; a system incorporating reusable, re-chargeable heated/cooled cups which may incorporate phase change material in their operation.

At least one bank and/or the whole thermal energy store may be used as a heat/cool battery.

At least one thermal energy source may be an environmental and/or natural and/or waste source of heat and/or cool.

At least one thermal energy source may be variable in temperature and/or thermal energy available over time.

At least one thermal energy source/sink may be at least one solar thermal collector (wherein the at least one solar thermal collector may be used at different times to collect solar heat and/or reject heat to the environment), for example including but not limited to, flat plate solar collectors using a pumped loop of ethylene glycol solution in water as thermal energy transfer fluid and/or evacuated tube solar collectors using heat pipes as thermal energy transfer connection and/or roof tiles and/or dedicated solar air heaters using air as thermal energy transfer fluid and/or photovoltaic panels and/or hybrid solar thermal photovoltaic panels using heat pipes and/or direct conduction and/or air and/or a pumped loop of ethylene glycol solution in water as thermal energy transfer fluid, all heated by the sun and/or cooled by night-time radiation and/or convection and/or conduction.

At least one thermal energy source/sink may be at least one ground source (wherein the at least one ground source may be used at different times to collect heat from the earth and/or reject heat to the earth).

At least one thermal energy source/sink may be at least one air source (wherein the at least one air source may be used at different times to collect heat from the air and/or reject heat to the air).

At least one thermal energy source may be at least one combustion system (for example but not limited to a wood burning stove and/or a natural gas burner and/or an oil burner).

At least one thermal energy source may be at least one electrical heater (for example but not limited to an electric water heater, heating water as a thermal energy transfer fluid and/or a resistance element in direct thermal contact with the thermal energy storage material in a bank).

At least one thermal energy source may be the waste heat (that would otherwise be dissipated and/or vented via, for example but not limited to, a fan coil to a first environment) from at least one air conditioner and/or refrigeration system and/or heat pump external to the thermal energy store (wherein the primary purpose is to cool a second environment).

At least one thermal energy source may be the waste heat (that would otherwise be dissipated and/or vented via, for example but not limited to, a fan coil and/or a cooling tower to a first environment and/or into a river and/or the sea) from at least one external system that is a heating system and/or industrial process and/or thermal electricity generation system and/or machine (for example, but not limited to, an internal combustion engine and/or a jet engine) and/or any other system of energy conversion that is less than 100% efficient and wherein some of the in-efficiency is manifested as waste heat.

At least one thermal energy source may be the waste heat (that would otherwise need to be managed and/or dissipated and/or vented via, for example but not limited to, a fan coil and/or a cooling tower and/or an active cooling system and/or a heat sink to a first environment) from at least one electronic assembly and/or other machine that generates waste heat in its operation including, for example, but not limited to, computer processors and/or micro-processors and/or amplifiers and/or batteries and/or lighting equipment and/or LED lighting and/or an electric motor and/or an internal combustion engine and/or photovoltaic solar cells, wherein the waste heat is not merely managed and/or dissipated and/or vented by these means, but is also used as a way for a bank or thermal energy store or thermal energy system to gain useful thermal energy.

At least one piece of equipment that generates waste heat may be wholly and/or partially directly embedded inside one or more banks and/or directly in thermal contact with one or more banks.

The at least one piece of equipment that generates waste heat may be at least one chemical battery for example, but not limited to, a configuration of lithium ion battery cells, wherein the thermal energy storage material of a bank and/or sub-bank within which the batteries are embedded and/or in thermal contact is chosen to enhance the likelihood in operation and/or storage of the batteries remaining within a preferred operating temperature range thereby enhancing one or more of the safety and/or effectiveness and/or efficiency of the one or more batteries.

At least one thermal energy source may be the waste thermal energy embodied in waste fluids, for example but not limited to exhaust air and/or waste water (that would otherwise be dissipated and/or vented via, for example but not limited to, exhaust air ducts and/or waste pipes, from a first environment into a second environment) including, for example but not limited to, waste water from domestic bathing and/or ventilation air extracted from a building at a temperature above and/or below that of a second environment and/or rainwater collected on a roof and vented to a storm drain.

A high rate of waste thermal energy can be absorbed over a short period into the thermal energy storage material of one or more banks of the thermal energy store, and later and/or at the same time, at a different, for example but not limited to lower, rate the thermal energy absorbed can be transferred to other banks of the same thermal energy store and/or sources/sinks external to it.

A smaller capacity active cooling system, for example but not limited to a heat pump, may be required because peak cooling loads for waste thermal energy are reduced by temporal buffering in the thermal energy storage material of one or more banks of the thermal energy store.

The elimination of and/or reduction in size and/or capacity of fans and/or pumps and/or heat pumps may result in a cooling system that is significantly quieter and/or produces fewer vibrations and/or uses less energy.

At least one thermal energy source may be at least one connection to at least one district heating system.

At least one thermal energy source may be at least one room and/or other internal environment, wherein waste heat accumulates as a result of, for example but not limited to, occupancy by metabolising people and/or animals, and/or use of equipment that generates waste heat, and/or solar gain as a result of solar energy passing through windows and/or other apertures open to the ingress of visible and/or ultra-violet and/or infra-red radiation and being absorbed by one or more surfaces internal to the room with a resultant rise in thermal energy and/or temperature and/or re-radiated as longer wavelength infra-red and/or other thermal radiation and/or warming the air in the room. The at least one thermal energy source which is at least one room and/or other environment, wherein waste heat accumulates, may be connected to the thermal energy store by at least one thermal energy transfer connection that comprises all and/or part of a system designed to extract waste thermal energy from the at least one room and/or other environment, comprising, for example but not limited to, an air conditioning and/or comfort cooling and/or radiant cooling system and/or designed to alternate between extracting waste thermal energy at some times and delivering desired heat at others, present in the one or more room and/or other environment.

At least one thermal energy sink may be a room and/or environment requiring to be heated and/or cooled.

The thermal energy transfer connection between the whole of and/or at least one banks of the thermal energy store and a room and/or environment requiring to be heated and/or cooled, may comprise at least one of, for example but not limited to a circuit and/or network of pipes and/or ducts carrying thermal transfer fluid such as ethylene glycol and/or R134a and/or air, and/or heat pipes and/or direct conduction and/or radiative transfer, transferring thermal energy to at least one of radiant walls and/or under-floor heating and/or radiant ceilings and/or chilled beams and/or radiators and/or over-sized radiators and/or fan-coil radiators and/or air handling systems.

The room and/or environment may constitute a location wherein perishable articles, for example but not limited to food and/or biological specimens and/or formerly living beings, are kept to delay processes of decay and/or promote freshness, for example, but not limited to, a larder room and/or domestic and/or commercial and/or industrial refrigerator and/or freezer and/or chiller and/or vehicle and/or container and/or cryogenic storage and/or morgue.

One or more banks of a thermal energy store may be connected to a source/sink of thermal energy comprising equipment that uses thermal energy to control the humidity of air by, for example but not limited to, using removal of thermal energy to cool humid air below its dew point and thereby cause water vapour to condense out and thereby reduce the humidity of the air, and/or thereafter adding thermal energy to re-heat the now dried air to a user comfort temperature, and/or adding thermal energy to water to evaporate some water and thereby add humidity to air.

One or more banks of a thermal energy store may be used to store excess and/or waste heat from a cooling system during the daytime (and/or any other period of peak heat load) so that the heat can be dumped at a later time when conditions allow that to be done with lower use of additional pumping and/or heat pumping energy, for example, but not limited to, during the night when air temperatures are colder and/or a solar panel can radiate heat to the night sky.

One or more banks of a thermal energy store may be used to store excess and/or waste heat from a cooling system during the daytime (and/or any other period of peak heat load) so that the heat can be dumped at a later time selected such that any required additional pumping and/or heat pumping energy will have a lower cost and/or be more available, for example but not limited to, when a lower costs night-time tariff from an electric utility is in force and/or when the wind blows on a wind turbine to generate electrical and/or mechanical power.

Any heat pumping and/or pumping of thermal energy between banks and/or to/from banks and thermal energy sinks/sources may be, in at least some cases and/or on at least some occasions, made to occur at a time selected such that any required additional pumping and/or heat pumping and/or heating and/or cooling energy will have a lower cost and/or be more available, for example but not limited to, when a lower costs night-time tariff from an electric utility is in force and/or when the wind blows on a wind turbine and/or the sun shines on a photovoltaic panel to generate electrical and/or mechanical power.

Any heat pumping and/or pumping of thermal energy between banks and/or to/from banks and thermal energy sinks/sources may be, in at least some cases and/or on at least some occasions, selected to occur when the temperatures of the banks and/or the thermal energy sinks/sources are such as to make the temperature difference between the source and destination of each thermal energy transfer optimal and/or preferable and/or better than at other times (whether on the basis of historical record and/or predicted future performance), so as to reduce the use of additional pumping and/or heat pumping and/or heating and/or cooling energy.

The phase transition utilised for thermal energy storage may be one or more of:

melting of a solid to become liquid and/or freezing of the same liquid to become a solid, with absorption and/or release of thermal energy, whether such melting and freezing happen at the same temperature or at different temperatures (e.g. wax melting; metals melting, especially selected eutectic alloys of metals melting; salts melting; salts melting to low-temperature ionic liquids); and/or the change of hydration state of a salt and/or salt hydrate, with absorption and/or release of thermal energy; and/or the change of the crystalline structure of a material from one conformation to another, with absorption and/or release of thermal energy; (e.g. $Na_2SO_4$ changing from rhombic to cubic crystal structure); and/or adsorption and/or absorption and/or desorption and/or evaporation and/or condensation of water vapour and/or other gases and/or liquids from and/or onto surfaces and/or from and/or into the structure of materials, with absorption and/or release of thermal energy (e.g. silica gel/water vapour) and/or;

any other change of physical and/or chemical state of a material and/or system of materials that absorbs and/or releases thermal energy wherein said change is reversible without substantial loss of energy absorbing and/or storing and/or releasing capacity across at least more than one reversible cycles.

The phase transition may absorb and/or release substantially more energy at the said one or more temperatures or one or more sub-ranges of temperatures than would be the case taking account solely of the thermal energy absorbed and/or released as specific heat at the said one or more temperatures or one or more sub-ranges of temperatures.

One or more thermal energy storage materials may be combined with one or more additives to promote desirable properties and/or suppress undesirable properties and/or otherwise modify the phase transition wherein the effect of the additives is, for example but not limited to, one or more of:

modification of the temperature and/or range and/or ranges of temperatures at which phase transition occurs; and/or promotion of nucleation when freezing salts and/or metals and/or water and/or any other liquid; and/or promotion of nucleation of desirable salt hydrates and/or suppression of nucleation of undesirable salt hydrates; and/or selectively controlling when nucleation and/or freezing and/or crystallization and/or any other energy releasing phase transition commences; and/or controlling the rate of nucleation and/or freezing and/or crystallization and/or any other energy releasing phase transition and the related rate of thermal energy release; and/or promoting the repeatability of cycles of thermal energy absorbing followed by thermal energy releasing phase transitions; and/or promoting an increase in the number of cycles of thermal energy absorbing followed by thermal energy releasing phase transitions in the useful life of the thermal energy storage materials; and/or promoting an increase in the useful operating time and/or pre-operation shelf-life of the thermal energy storage materials; and/or enhancing the thermal conductivity of the thermal energy storage materials; and/or any other desirable modification of the phase transition properties of the one or more thermal energy storage materials.

One or more thermal energy storage materials and/or additives may be chosen to improve and/or optimise a trade off between their cost and/or safety and/or physical density and/or phase transition temperature and/or the energy absorbed and/or released during phase transition and/or the characteristics of the phase transition and/or the minimisation of volume change from one side to the other of the phase transition and/or narrowness of their phase transition temperature range and/or similarity and/or difference of their phase transition temperatures when absorbing and/or releasing energy and/or repeatability of releasing and/or absorbing thermal energy and/or loss of energy associated with absorbing and subsequently releasing thermal energy and/or thermal conductivity and/or materials compatibility and/or other physical properties according to criteria established by the thermal energy storage system designer and/or user and/or purchaser and/or legal criteria and/or safety criteria and/or any other design and/or usage and/or benefit criteria.

In the event of mains electric power failure, the system of the present invention may be self-powering for at least some of its functions by allowing for heat transfers from hotter to colder banks via, for example, but not limited to, a steam piston and/or a Stirling engine and/or Rankine cycle engine and/or steam turbine, whether on its own and/or attached to an electric alternator and/or dynamo, and/or a thermoelectric and/or thermionic device used as an electrical generator.

The system of the present invention may also compensate dynamically for change in the thermal energy storage materials properties (e.g. melting temperature; sharpness of melting temperature) over time.

The system of the present invention may also be for both heating and cooling and wherein at least one bank may act as a source of thermal energy so as to increase the temperature of one or more thermal energy sinks and simultaneously and/or at a different time may act as a sink of thermal energy so as to reduce the temperature of one or more thermal energy sources. The thermal store of the present invention may also comprise two banks so there is no heat pumping apparatus in the thermal energy transfer connection between them.

Using the present invention also allows water heating by passing through several banks at rising phase transition temperatures. This allows mixed grade heat to be used for water heating.

Thermal energy storage as described in the present application can refer to a number of technologies that store energy in a thermal reservoir for later reuse. The described technologies can be employed to balance energy demand between day time and night time. The thermal reservoir may be maintained at a temperature above (hotter) or below (colder) than that of the ambient environment.

According to a third aspect of the present invention there is provided a method of heating and/or cooling an environment, said method comprising:

providing a heat source; and providing a series of banks containing heat storage material;

wherein the heat storage material in the series of banks is capable of storing and/or releasing energy at different temperatures.

According to a fourth aspect of the present invention there is provided a method of heating and/or cooling an environment, said method comprising:

providing a thermal energy store capable of accepting and/or storing and/or releasing thermal energy at a range of one or more temperatures to/from at least one thermal energy source and/or sink, said thermal energy store comprising:

providing a configuration of one or more thermal energy storage banks, each of said thermal energy storage banks having a usual operating temperature range;

providing at least one or more of the thermal energy storage banks capable of containing an appropriate amount and type of thermal energy storage material comprising a single material or a mixture of materials;

wherein said thermal energy storage material in at least one bank contains at least some of one or more types of thermal energy storage material that undergoes at least one energy absorbing and/or releasing phase transition at one or more temperatures or one or more sub-ranges of temperatures within the usual operating temperature range of each bank; and wherein each phase transition is associated with a change in the physical and/or chemical properties of said thermal energy storage material.

BRIEF DESCRIPTION OF THE FIGURES

Embodiments of the present invention will now be described, by way of example only, with reference to the accompanying drawing in which.

DETAILED DESCRIPTION

Figure 1:
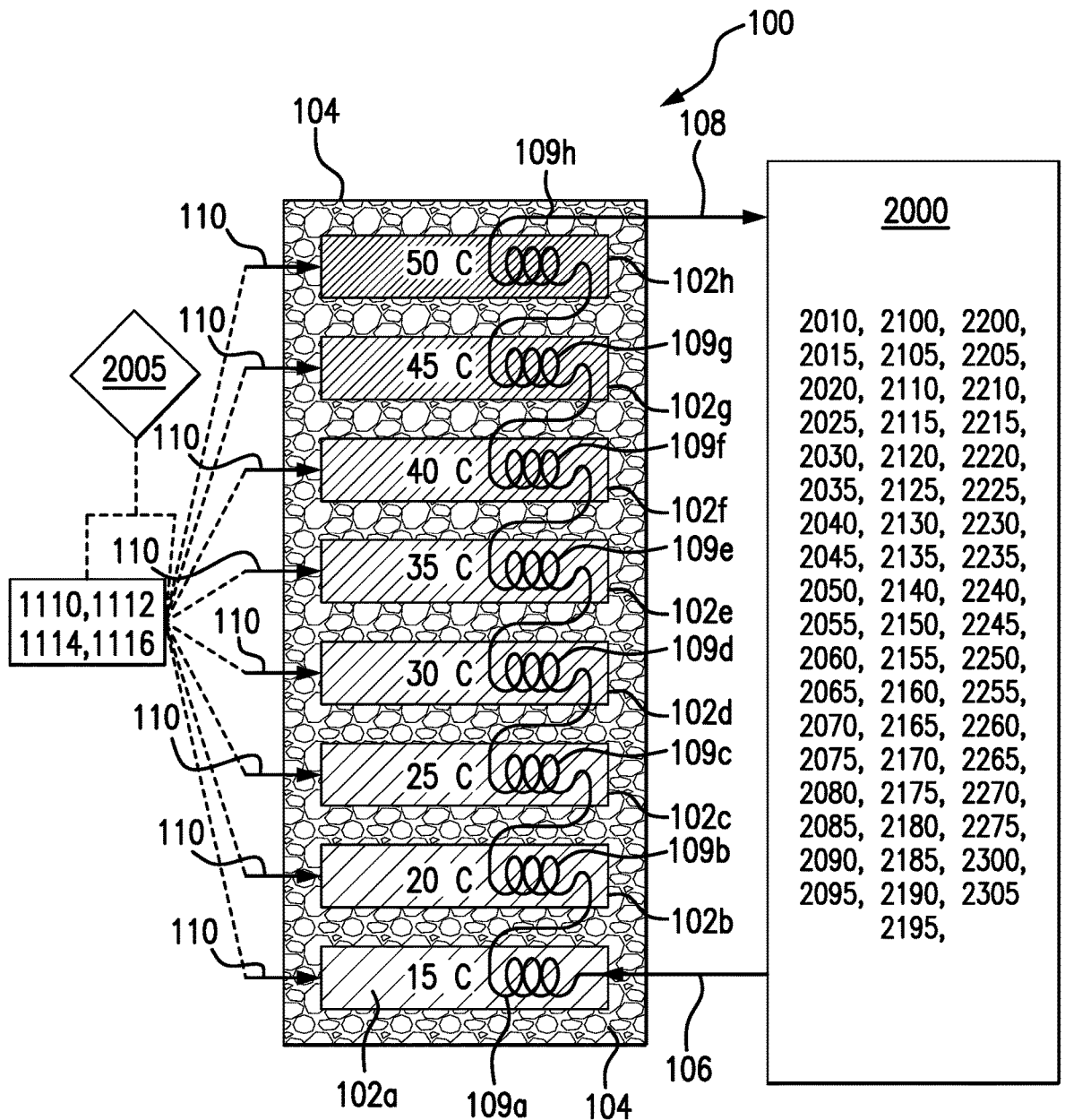
FIG. 1 is a schematic representation of an energy storage system according to a first embodiment of the present invention.

FIG. 1 is a representation of an energy storage system according to the present invention generally designated 100. The heating/cooling system comprises a series and/or a collection of banks 102*a*, 102*b*, 102*c*, 102*d*, 102*e*, 102*f*, 102*g* and 102*h* which are used to collect and store thermal energy from, for example, a solar thermal panel (not shown) and, for example, later deliver thermal energy to heat up cool water. Although FIG. 1 shows eight banks, the invention is intended to cover any suitable number of banks. Each of the banks 102*a*, 102*b*, 102*c*, 102*d*, 102*e*, 102*f*, 102*g*, 102*h* contains a different phase change material which therefore has a different melting point to store heat. As shown in FIG. 1, there is insulation 104 around the banks 102*a*, 102*b*, 102*c*, 102*d*, 102*e*, 102*f*, 102*g*102*h*. Bank 102*a* is at temperature of about 15° C. by virtue of containing a suitable phase change material with a phase transition temperature of 15° C. Similarly, bank 102*b* is at temperature of about 20° C., bank 102*c* is at temperature of about 25° C., bank 102*d* is at temperature of about 30° C., bank 102*e* is at temperature of about 35° C., bank 102*f* is at temperature of about 40° C., bank 102*g* is at temperature of about 45° C., bank 102*h* is at temperature of about 50° C. Although FIG. 1 shows specific temperatures, the present invention is intended to cover any selection of temperatures. As shown in FIG. 1 each of the banks in the energy storage system 100 contain heat exchangers 109*a*, 109*b*, 109*c*, 109*d*, 109*e*, 109*f*, 109*g*, 109*h*. Cold water is inserted from an inlet 106 into heat exchanger 109*a* and passes through heat exchangers 109*b*, 109*c*, 109*d*, 109*e*, 109*f*, 109*g* and 109*h*. Heated water may exit outlet 108 at about 45° C. Heat from, for example, a solar thermal panel 1110 and/or from the environment 1112 or other heat sources 1114 may be fed in from any of feed points 110 using heat exchange means 1116.

In FIG. 1, the heat storage medium in each of banks 102*a*, 102*b*, 102*c*, 102*d*, 102*e*, 102*f*, 102*g*, 102*h* could be water (or some other heat storage medium), but preferably the heat storage medium is a suitable phase change material (PCM) A PCM is used for several reasons:

The energy density of the PCM heat store (kWh stored per litre) will be much higher than for water;

Large amounts of energy can be stored (melting) or extracted (freezing the PCM) within very narrow temperature bounds around the melting point—thus each bank can genuinely represent a specific temperature in a heating ladder;

There is no reason to stick to cylindrical shapes typical for water tanks: the store can be a cuboid or any shape convenient to the application which means further density advantages.

As long as over the whole storage cycle the different banks of the multi-bank PCM heat store are kept in equilibrium (i.e. as much heat is added to any given bank as is extracted from the same bank via water heating and incidental losses) it can at any given moment accept heat from any environmental heat source at any temperature from over 15° C. to over 50° C. (for the example in FIG. 1) and route it to the appropriate bank. For example when a solar panel is just warming up in the morning and it reaches 20° C., it can already start to load heat into the 15° C. bank of PCM material. At midday in bright sunlight when the solar panel's stagnation temperature could be over 100° C. the control system 2005 of the thermal store can choose an appropriate heat transfer fluid flow rate and bank into which to load heat, for instance:

A low flow rate to take heat from the solar panel at 60° C. to load into the 50° C. bank; or A higher flow rate to take heat at 40° C. to load into the 35° C. bank.

It should be noted also that heat transfer fluid that started at the solar panel at say 60° C. is, after it exits the heat exchanger in the 50° C. bank, still at or above 50° C. This can be routed now to load heat to the 45° C. bank, and so on down to the coolest bank. Thus heat transfer fluid can be made to return to the solar panel at around 15° C. in this example to be warmed again. So almost all the useful heat collected by the solar panel can be extracted and stored. Also the solar thermal panel itself will perform more efficiently, with lower thermal losses, by virtue of the low temperature of heat transfer fluid entering it.

Figure 2:
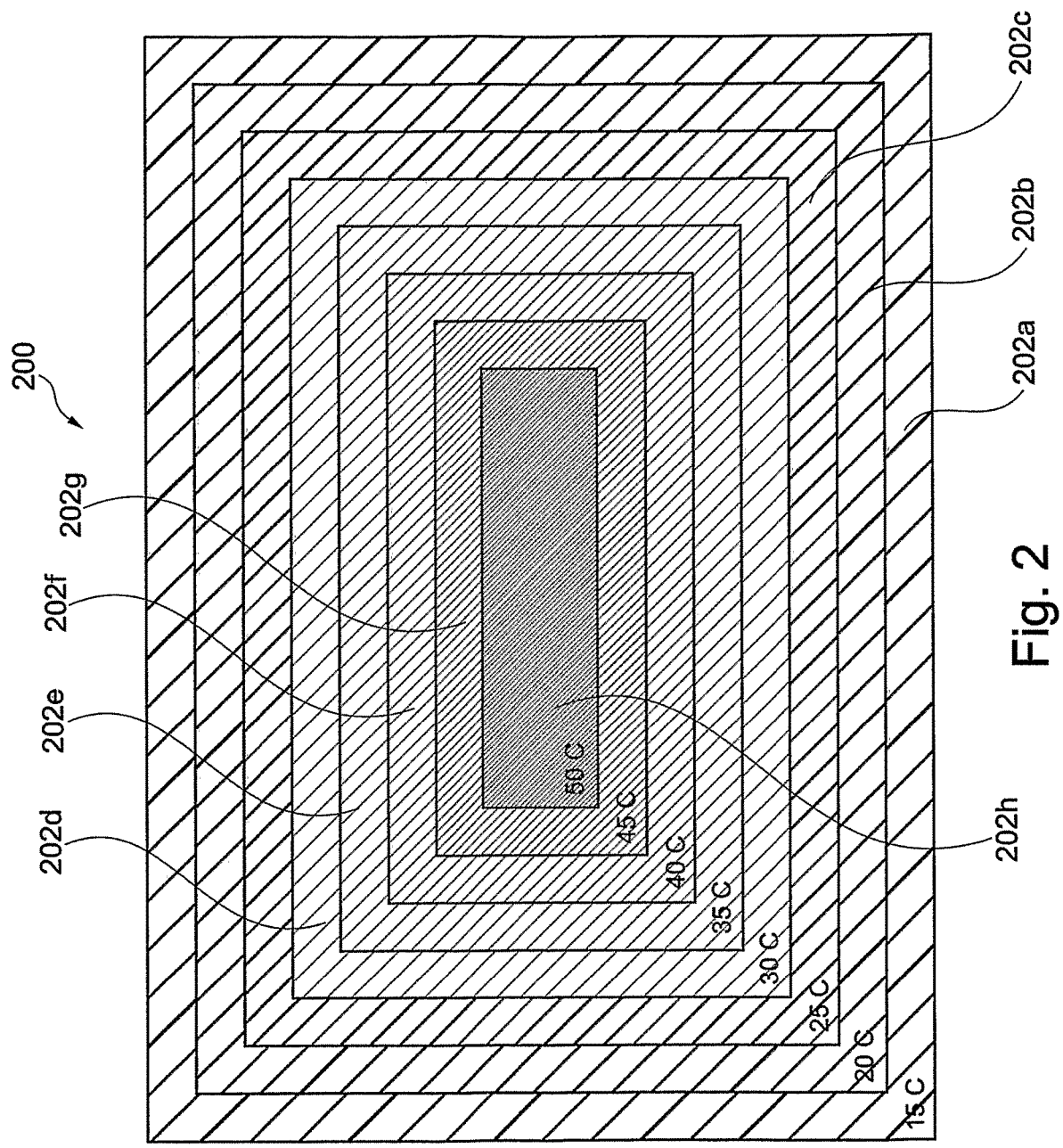
FIG. 2 is schematic representation of an energy storage system according to a further embodiment of the present invention comprising a nested multi-bank phase change material heat store.

A further preferred embodiment is to nest the banks of PCM inside each other like Russian dolls. Such an energy storage system 200 is shown in FIG. 2 which has nested banks 202*a*, 202*b*, 202*c*, 202*d*, 202*e*, 202*f*, 202*g*, 202*h*. Bank 202*a* is at temperature of about 15° C., bank 202*b* is at temperature of about 20° C., bank 202*c* is at temperature of about 25° C., bank 202*d* is at temperature of about 30° C., bank 202*e* is at temperature of about 35° C., bank 202*f* is at temperature of about 40° C., bank 202*g* is at temperature of about 45° C., bank 202*h* is at temperature of about 50° C. (For clarity purposes insulation has been omitted from FIG. 2).

The innermost bank 202*h* would be the hottest, with the outermost bank 202*a* the coolest. Of course there would still be maintained some insulation between each layer. In this case the loss of heat from each bank would be proportional to the much smaller ΔT between each bank and its outer neighbour.

| Bank (° C.) | ΔT (° C.) | Derived by (° C.) |
| --- | --- | --- |
| 55 | 5 | 55-50 |
| 50 | 5 | 50-45 |
| 45 | 5 | 45-40 |
| 40 | 5 | 40-35 |
| 35 | 5 | 35-30 |
| 30 | 5 | 30-25 |
| 25 | 5 | 25-20 |
| 20 | 5 | 20-15 |
| 15 | −5 | 15-20 |

By contrast, the embodiment of FIG. 1 separately insulates each bank from the local environment. If the insulation is of identical type and thickness around each bank then the higher temperature banks will lose more heat to their surroundings than the lower temperature ones, because heat loss is proportional to the ΔT between the bank and its surroundings.

For a multi-bank PCM store inside a house, with surrounding temperature 20° C.:

| Bank (° C.) | ΔT (° C.) | Derived by (° C.) |
| --- | --- | --- |
| 55 | 35 | 55-20 |
| 50 | 30 | 50-20 |
| 45 | 25 | 45-20 |
| 40 | 20 | 40-20 |
| 35 | 15 | 35-20 |
| 30 | 10 | 30-20 |
| 25 | 5 | 25-20 |
| 20 | 0 | 20-20 |
| 15 | −5 | 15-20 |

The embodiment of FIG. 1, or a regular hot water tank, over time loses energy to the local environment. The nested multi-bank PCM heat store of FIG. 2 can, by suitable choice of outermost bank temperature to be equal to or lower than the local environment temperature, be made virtually neutral. For example in FIG. 2, if the local environment is at 20° C., the thermal store's outermost 15° C. layer will slowly absorb heat from the local environment.

This means energy storage system 200 will store the heat put into it much better than energy storage system 100 (although over time the grade of heat it holds will reduce as heat flows from the high temperature core out to lower temperature banks around it). It will also be cool to the touch making it possible to integrate it into places one would not want to put a hot water tank.

It should be noted that everything described so far can also apply in inverse for cold applications, with a coldest layer as the innermost bank, well below environmental temperature, and increasingly warm layers surrounding it, with the outermost layer the warmest at close to environmental temperature.

Figure 3:
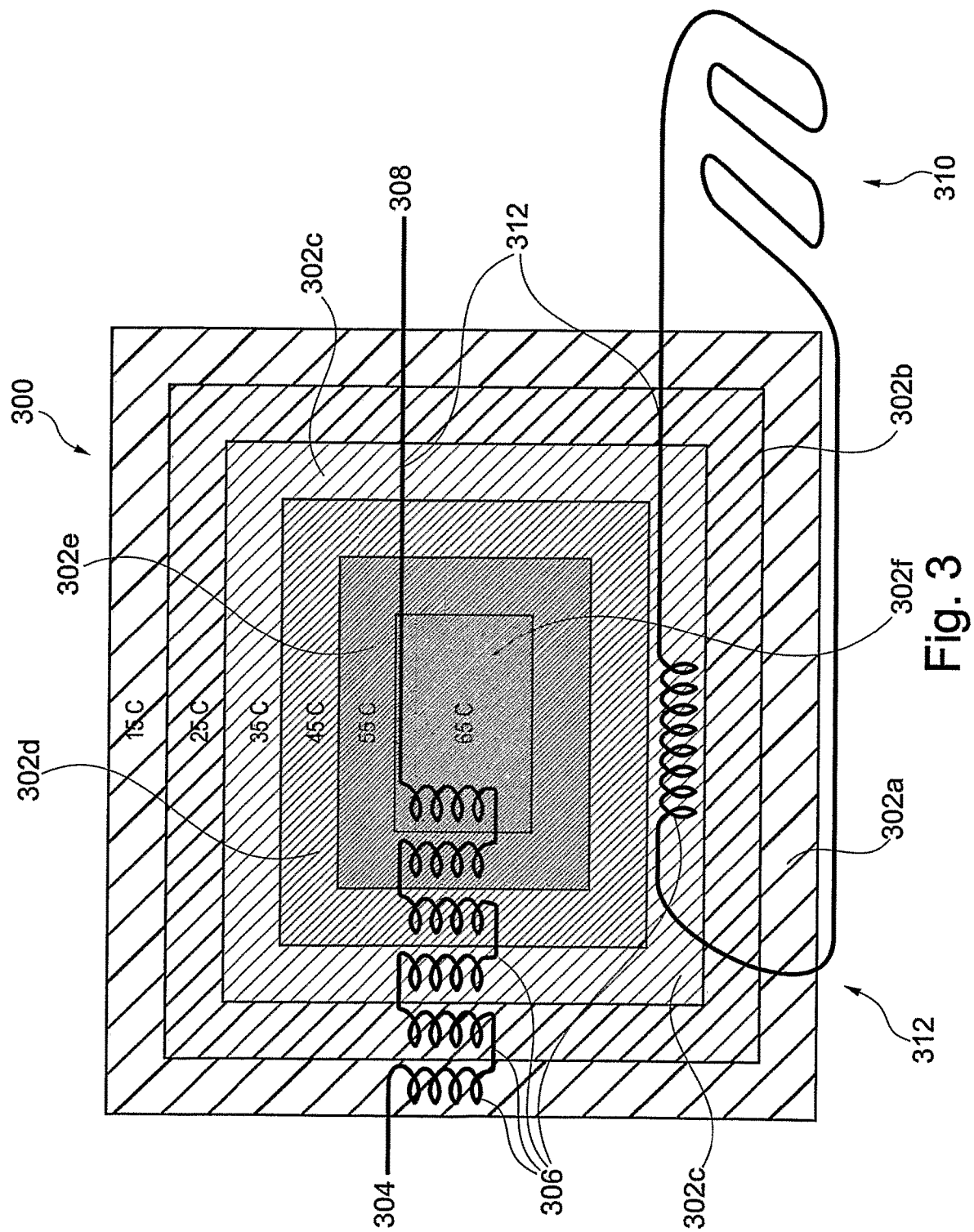
FIG. 3 is a schematic representation of an energy storage system according to a further embodiment of the present invention of a nested multi-bank phase change material heat store used for underfloor heating as well as water heating.

We now refer to FIG. 3 which relates to an energy storage system 300. There are banks 302*a*, 302*b*, 302*c*, 302*d*, 302*e*, 302*f*. Bank 302*c* is preferably the largest bank as this is connected to an underfloor heating system 310 which has insulation 312 around its pipes where they pass through other banks 302*a* and 302*b* in the energy storage system 300. The energy storages system 300 contains an inlet 304 for mains cold water and heat exchangers 306 in each of the banks 302*a*, 302*b*, 302*c*, 302*d*, 302*e*, 302*f*. There is also an outlet 308 for hot water which also benefits from insulation 312 when it passes through banks 302*e*, 302*d*, 302*c*, 302*b* and 302*a*.

Figure 4:
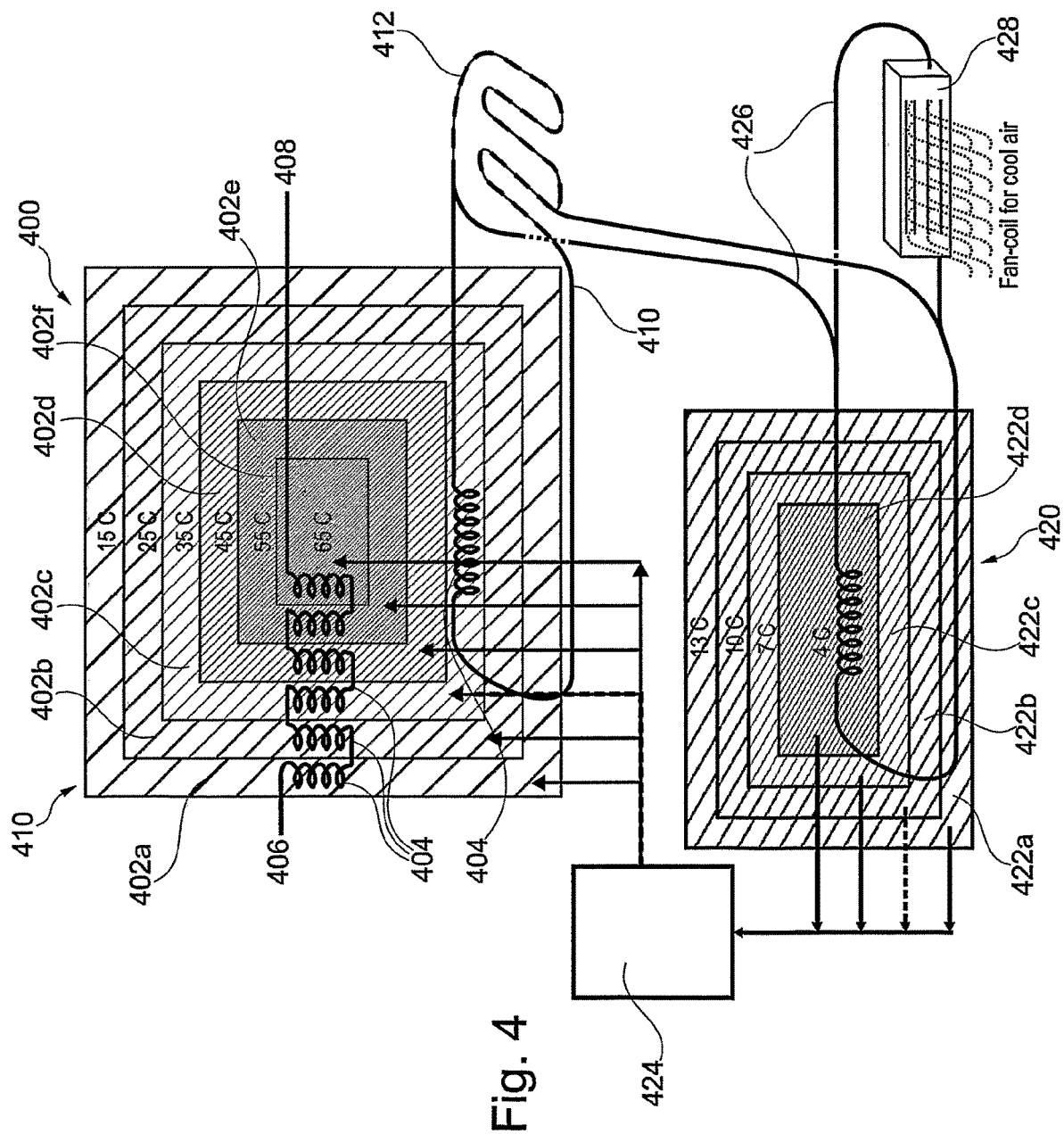
FIG. 4 relates to a single heat pump directly connected between two PCM stores, one intended to store and provide warmth for heating and hot water and one intended to store and provide coolth for cooling according to a further embodiment of the present invention.

We now refer to FIG. 4 which is a further energy storage system 400 according to the present invention. There is a multi-bank phase change material (MBPCM) heat store generally designated 410. There are a series of banks 402*a*, 402*b*, 402*c*, 402*d*, 402*e*, 402*f* connected with heat exchangers 404. There is also a cold water inlet 406 and a hot water outlet 408. The energy storage system 400 also has a heating loop 410 and a heating/cooling loop 412. There is also a multi-bank phase change material (MBPCM) cold store generally designated 420 which contains banks 422*a*, 422*b*, 422*c*, 422*d*. A heat pump 424 may be used to extract heat from selected banks (any of 422*a*, 422*b*, 422*c*, 422*d*) of cold store 420 and load it at higher temperatures into selected banks (any of 402*a*, 402*b*, 402*c*, 402*d*, 402*e*, 402*f*) of heat store 410 (for clarity purposes the heat exchangers to and from heat pump 424 have been omitted). Exiting from the cold store 420 there is a cooling loop 426 which is connected to a fan coil 428 which may blow cold air and/or may be connected at times when no heating is required to underfloor loop 412 to deliver comfort cooling.

To generate cool for air-conditioning, heat can be removed from a bank of the PCM cool store using a heat pump and concentrated to a suitable higher temperature. This higher temperature heat could be released to the environment; however an alternative is to add it to a bank of a PCM heat store that needs additional heat.

The highlighted path in FIG. 4 shows heat being removed from 10° C. bank 422*b* of cool store 420 via heat pump 424 and entering heat store 35° C. bank 402*c*. The benefit is high since this single use of a heat pump is both adding heat to the heat store 410 for later use (e.g. for hot water, space heating) and simultaneously (and with the same energy to drive the heat pump) removing heat from the cool store 420, thereby adding cool to it for later use (e.g. for air conditioning).

Figure 5:
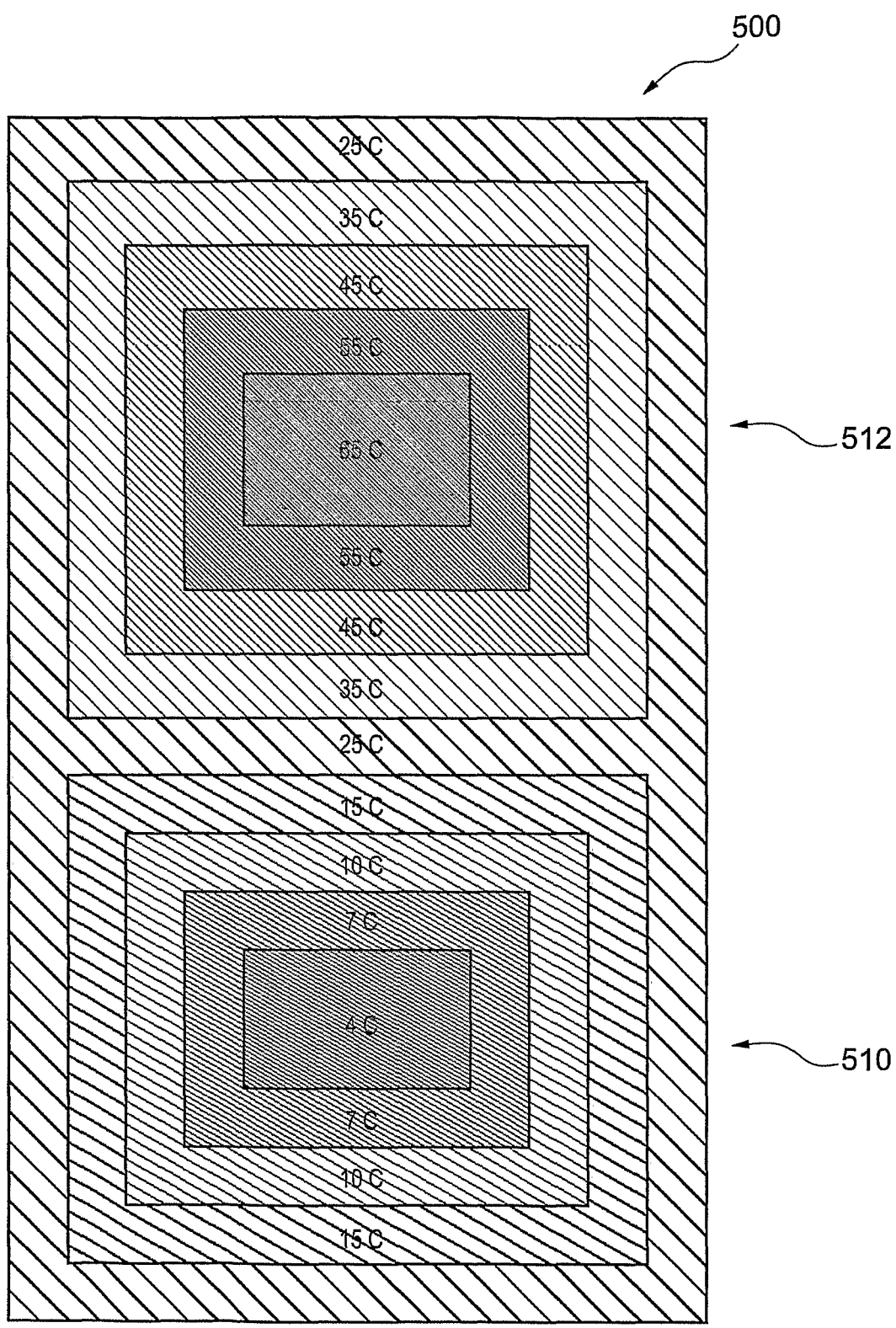
FIG. 5 is a reconfigured store which has two centres (one cold, one hot) and an outermost bank at or close to room temperature according to a further embodiment of the present invention.

It is not clear that there really need to be two distinct stores (one for heat and one for cold) as the ranges of useful temperature overlap. FIG. 5 therefore shows a further energy storage system 500 with a cold store 510 and heat store 512 joined together, having two centres, one hot and one cold and an outermost bank at or close to room temperature (assuming it will be housed inside a building's thermal envelope).

Figure 6:
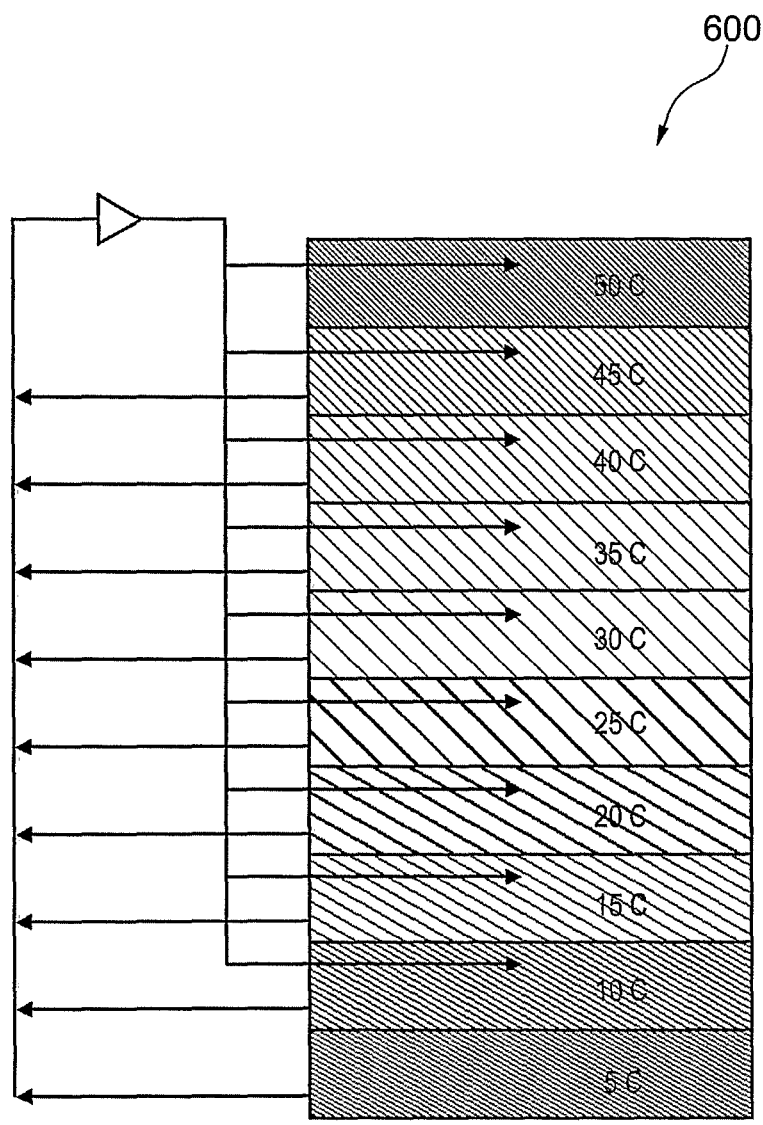
FIG. 6 relates to a single time-shared heat pump with many-to-many (i.e. multiple) connectivity according to a further embodiment of the present invention.

In FIG. 6, a similar shared heat and cold store 600 is shown which has a single time-shared heat pump with many-to-many connectivity, connected on its input side to all except the hottest bank (the connection is multiplexed, i.e. a choice can be made of which cold source to draw upon) and on its output side connected by a multiplexed connection to all except the coldest bank.

Most practical implementations of Multi-Bank PCM Heat/Cool Stores will need to re-balance the amount of heat stored between banks. Sometimes this will be possible purely by controlling the flow of heat from environmental sources to each bank; however it is likely that this will not always be possible.

Furthermore, often some banks of PCM are required, for example for air conditioning, at below ambient temperature or below room temperature. A conveniently cold ambient source may not be available.

A multi-bank PCM heat store could be configured with one or more heat pumps. These could be connected by heat exchangers, valves, etc in such a way that the heat pump(s) can pump heat from any bank to any warmer bank.

Many practical implementations of heating and cooling systems using multi-bank phase change heat stores will likely include one or more heat pumps to provide a guaranteed way to lift heat from cooler to warmer.

Figure 7:
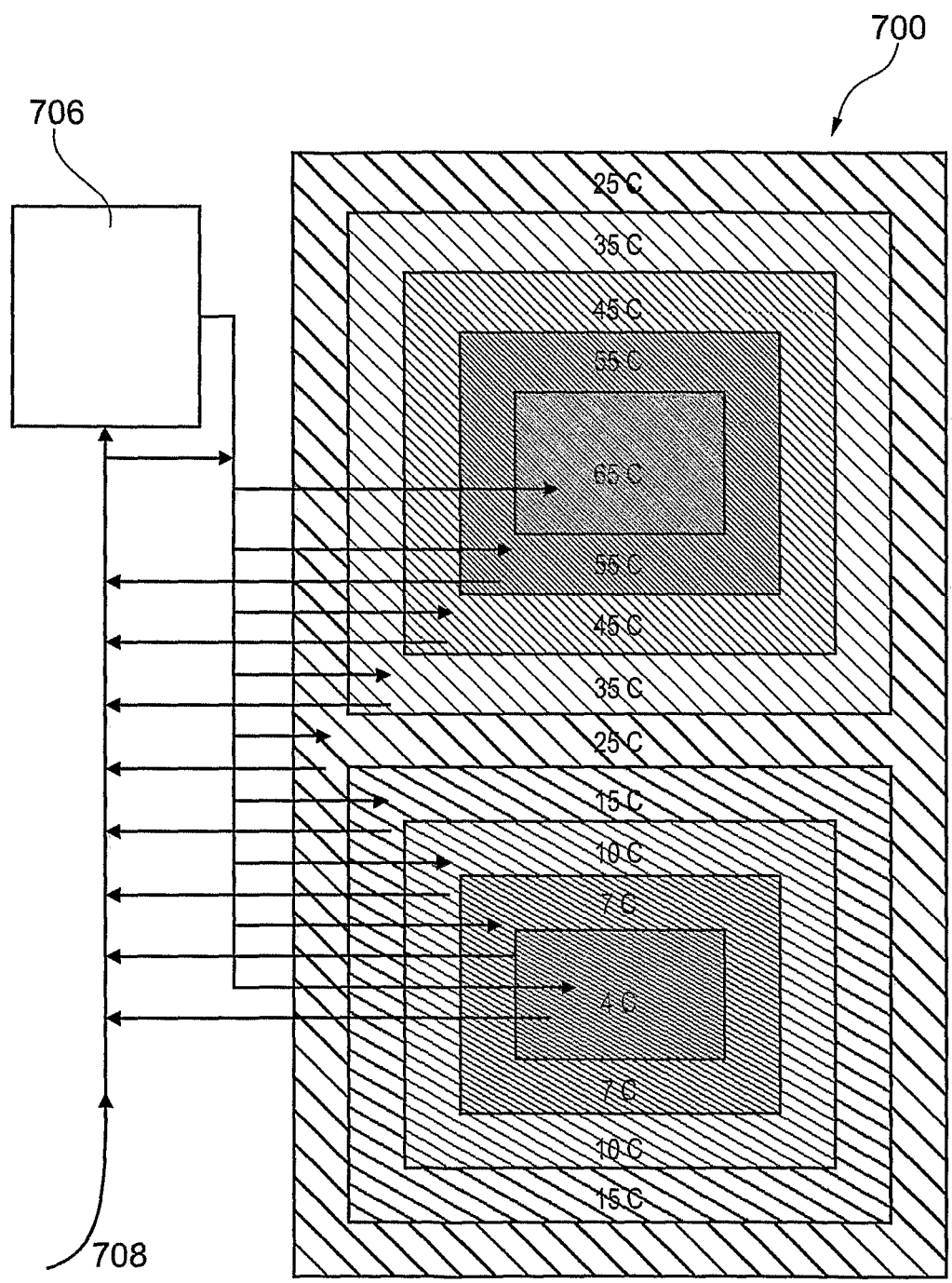
FIG. 7 relates to a heat pump performing dual duty and two heat transfer buses according to a further embodiment of the present invention.

A heat pump can be time multiplexed to perform dual duty both as a bank to bank heat pump and also as an external heat pump as in practice, there will be occasions when it makes sense to transfer heat directly from colder to hotter banks of a thermal store, and others when it makes sense to remove heat to or extract heat from the surrounding environment. With suitable configuration of pipes and valves it is possible to allow for all these possibilities. In that case control algorithms can add this direct transfer to their repertoire and optimise for this as well, thus dynamically choosing it when appropriate. This is shown in FIG. 7 where energy storage system 700 has a heat pump 706 performing this dual duty. There is an environmental heat source 708. (For clarity purposes the insulation and some of the valves have been omitted).

Figure 8:
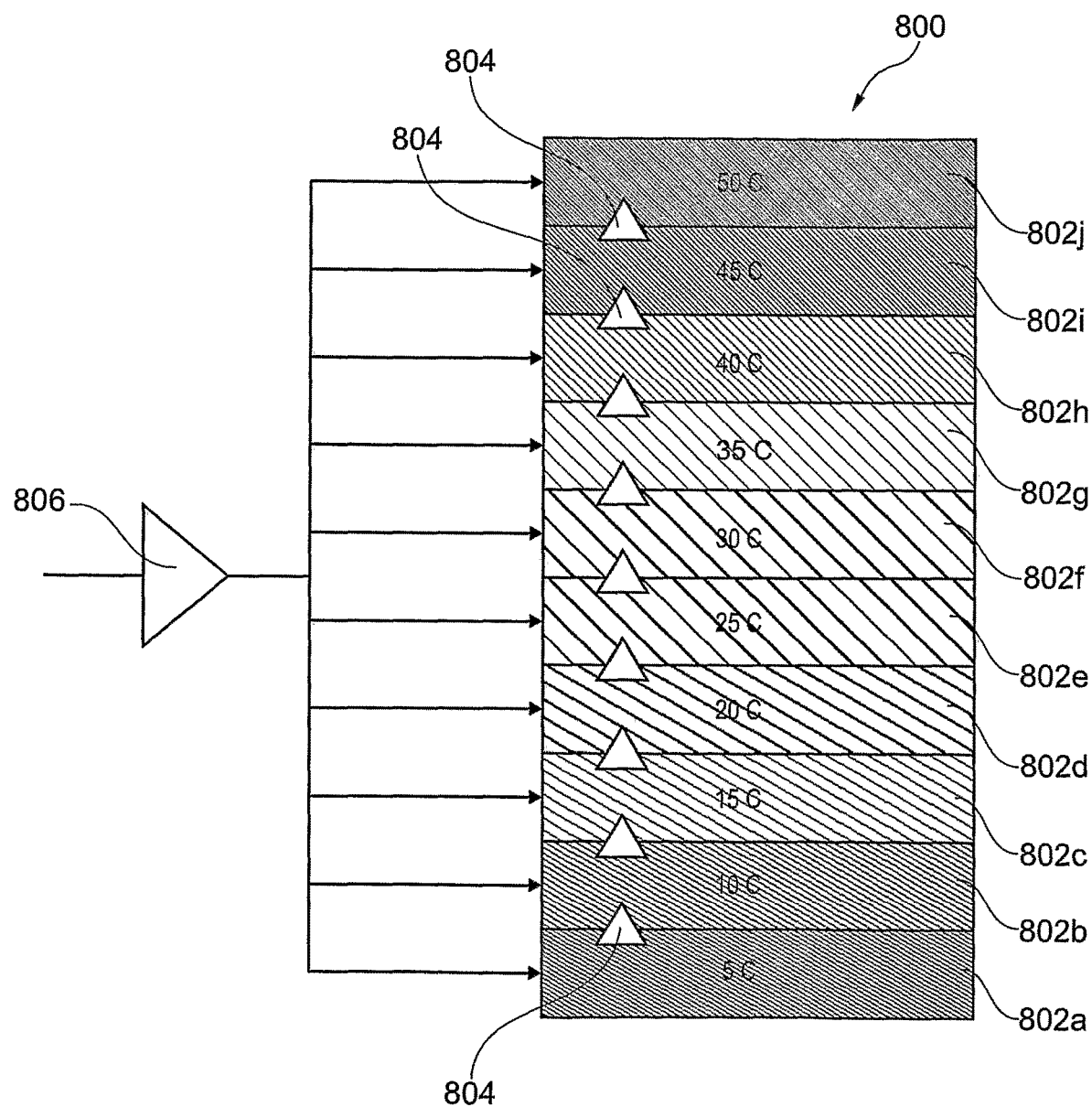
FIG. 8 relates to pulling heat from an environmental source using a heat pump and lower capacity heat pumps interposed between each bank according to a further embodiment of the present invention.

Instead of time-sharing or multiplexing a heat pump, an alternative is to interpose a lower capacity heat pump between each bank. This is illustrated in the energy storage system 800 shown in FIG. 8 which has a series of banks 802a, 802b, 802c, 802d, 802e, 802f, 802g, 802h, 802i, 802j between which are interposed heat pumps 804. (For clarity pipework, heat exchangers connecting heat pumps 804 to the banks and insulation are omitted). There is also an external heat pump 806 allowing heat to be drawn from an environmental source.

Figure 9:
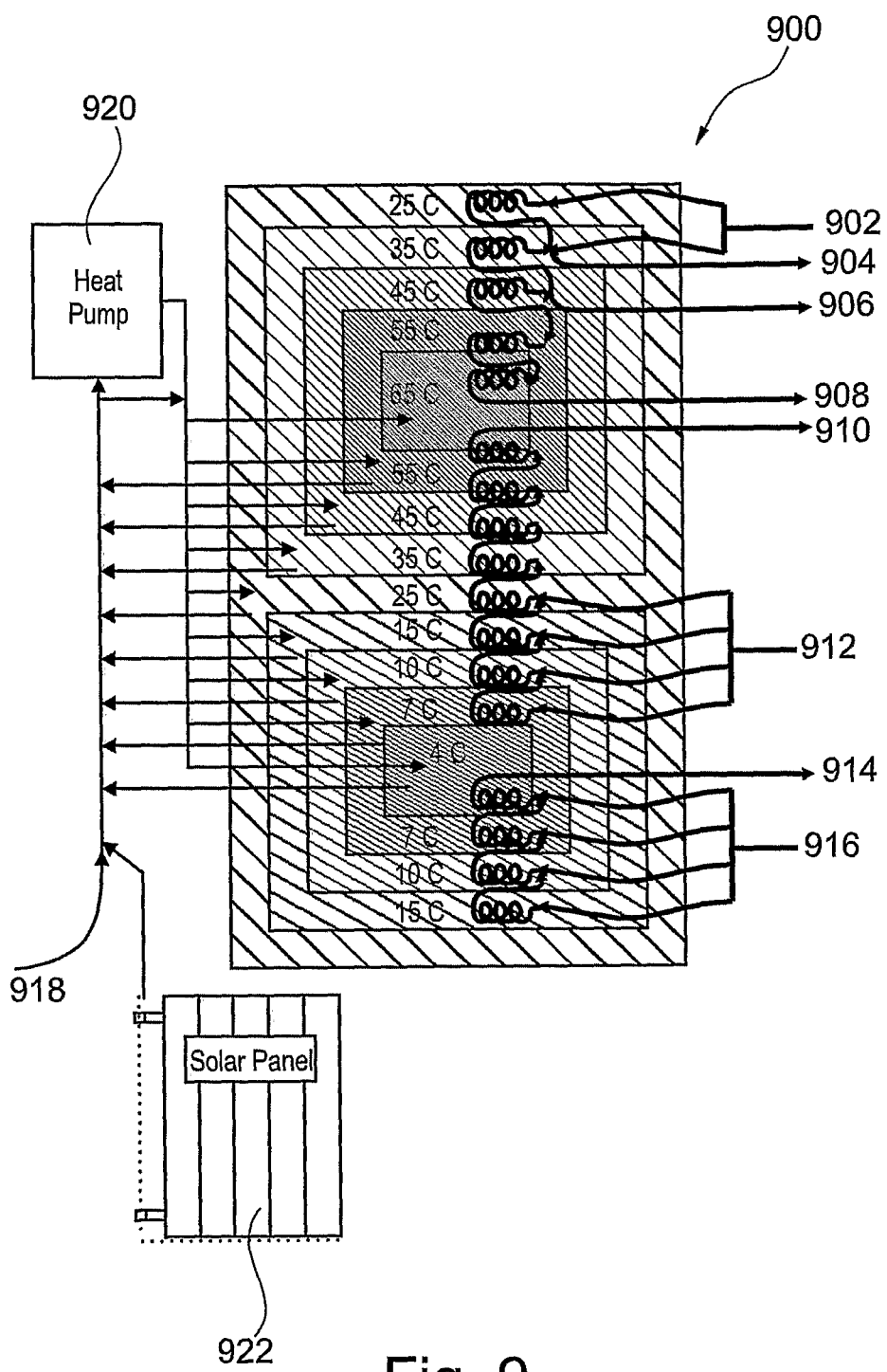
FIG. 9 relates to multi bank PCM heat & cool store for domestic heating, hot water and air conditioning from environmental heat sources using a shared heat pump according to a further embodiment of the present invention.

An application of a heat & cool store for domestic heating, hot water and air conditioning from environmental heat sources using a shared heat pump is shown in FIG. 9. An energy storage system 900 comprises a series of banks where heated water or other heat transfer fluids may be used for a variety of purposes. Inlet 902 is used as a heating return; outlet 904 is used for underfloor heating; outlet 906 is used for fan-coil radiator flow; outlet 908 is used for radiator flow; inlet 912 is used for cold mains; outlet 910 is used for hot water; inlet 916 is used for air conditioning return and outlet 914 is used for air conditioning flow. Inlet 918 is an environmental heat source. Heat pump 920 may be used as a heat pump or by-passed if the environmental or solar heated water from a solar panel 922 is at a sufficiently high temperature. (The insulation has been omitted for clarity and multiplexing valves omitted for clarity. On the left-hand side of FIG. 9 flows are only shown and returns are omitted for clarity. Furthermore, pathways for cooling via night-time radiation from solar panel are omitted for clarity).

Consider the case where environmental heat is loaded into an MBCPM Heat/Cool Store by using an External Heat Pump to raise the temperature at which heat is transferred from the environmental source to the Heat Store to above the temperature of the coldest bank of the Heat Store Instead of using a heat pump to directly move heat from a lower temperature environmental source, a thermal store could instead be configured with one or more additional (colder) banks of PCM that have temperatures lower than the environmental source. The heat from the environmental source can flow into these colder banks without initial heat pumping.

Heat pumps interposed between each bank of the thermal store can be used to pump the heat so acquired to hotter banks; thereby making the heat useful and keeping the colder banks at a low enough temperature that they can continue to capture environmental heat thus eliminating the need for any external heat pumps.

We can consider the example of an MBCPM system used to drive a radiator-based central heating system, where the primary heat source is a ground loop recovering low grade heat from the earth at 5° C.

Figure 10:
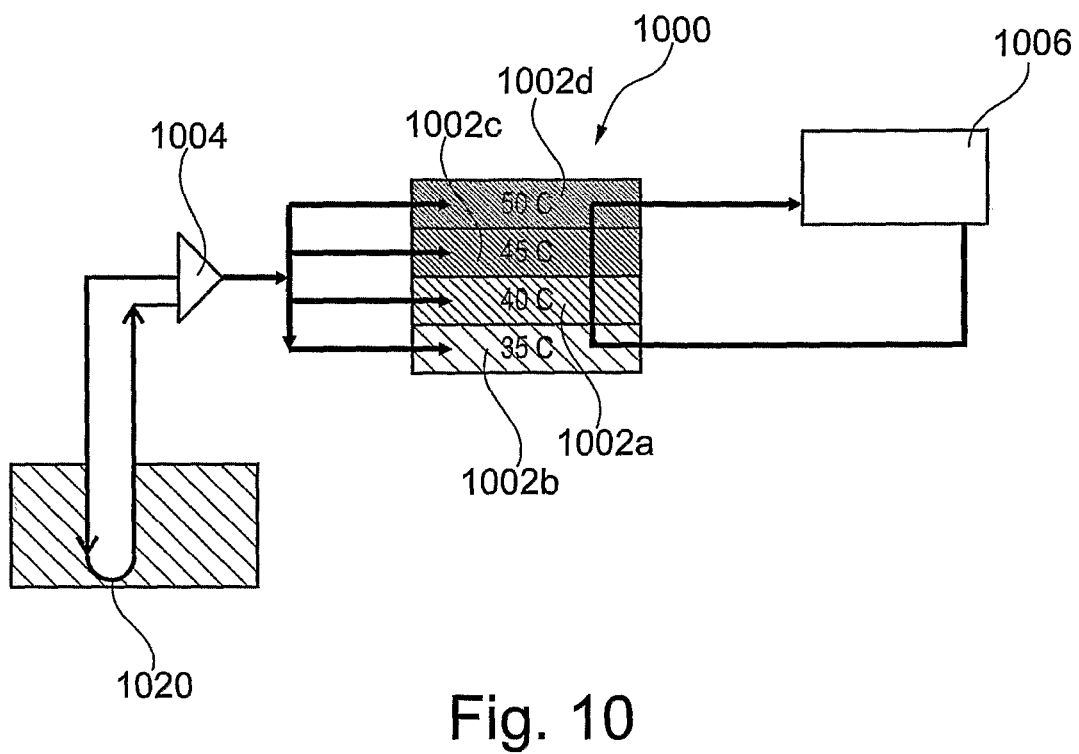
FIGS. 10 and 11 relate to a radiator-based central heating system according to a further embodiment of the present invention.
Figure 11:
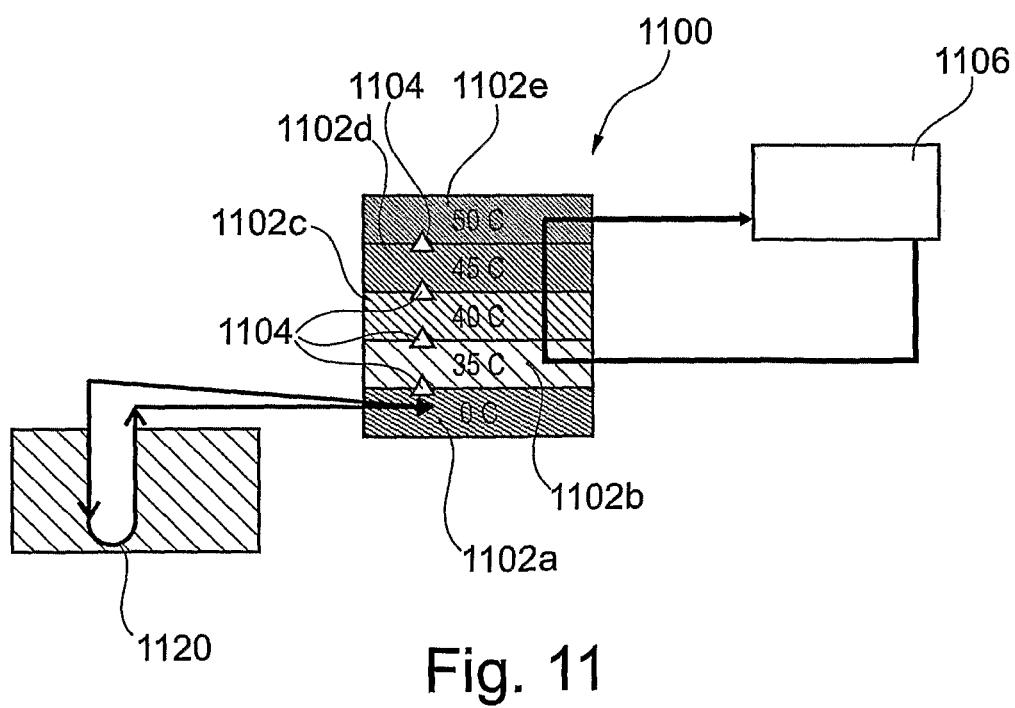

We refer to FIGS. 10 and 11 which represent energy storage systems 1000, 1100, respectively.

In one case as shown in FIG. 10, there is an external heat pump 1004 that raises the heat of the ground water 1020 to 35° C.-50° C.+ in order that it can be loaded into the PCM banks 1002a, 1002b, 1002c, 1002d at 35, 40, 45, 50° C., respectively. The heated water is fed to radiator 1006. In FIG. 11, there are PCM banks 1102a, 1102b, 1102c, 1102d which have heat pumps 1104 interposed between each bank. The heated water is fed to radiator 1106.

Bank 1102a, specially configured with PCM with melting point 0° C., is introduced. Heat is captured from ground water 1120 by passing this 5° C. fluid through heat exchange with the 0° C. bank 1102a. Later or simultaneously, this heat is pumped to the warmer banks using heat pumps 1104.

It will be clear to those of skill in the art, that the above described embodiment of the present invention is merely exemplary and that various modifications and improvements thereto may be made without departing from the scope of the present invention. For example, any suitable type of phase change material may be used which can be used to store energy.

The invention claimed is:

1. A thermal energy store, comprising:
a first heat transfer fluid that has exchanged heat with at least one or more of a heat source;
a configuration of three or more thermal energy storage banks having at least a first energy storage bank, a second energy storage bank and a third energy storage bank; wherein each of said first energy storage bank, said second energy storage bank and said third energy storage bank are encased at least in part in an insulation;
wherein each of said first energy storage bank, said second energy storage bank and said third energy storage bank are at least in part insulated from one another by said insulation respectively configured between each of said first energy storage bank, said second energy storage bank and said third energy storage bank;
wherein said first heat transfer fluid is respectively fed to one or more thermal energy storage banks of said configuration of three or more thermal energy storage banks that are configured in parallel;

said first energy storage bank having a first feed point for feed of said first heat transfer fluid, said second energy storage bank having a second feed point for feed of said first heat transfer fluid and said third energy storage bank having a third feed point for feed of said first heat transfer fluid;

wherein said first heat transfer fluid is configured as a first heat transfer fluid feed to any one or more of said first feed point, said second feed point and said third feed point;

wherein said first heat transfer fluid is configured to be fed in a parallel feed configuration to any two or more of said first feed point, said second feed point and said third feed point;

wherein each of said three or more thermal energy storage banks has a temperature, wherein the temperature of at least two of said first energy storage bank, said second energy storage bank and said third energy storage bank is different;

wherein each of said first energy storage bank, said second energy storage bank and said third energy storage bank are configured to be fed said first heat transfer fluid configured to provide an energy transfer connection with at least one thermal energy source and to transfer heat from said thermal energy source to said configuration of three or more thermal energy storage banks;

a control system of the thermal energy store configured to execute control logic controlling a flow rate of said first heat transfer fluid into one or more of said first energy storage bank, said second energy storage bank and said third energy storage bank;

wherein said first heat transfer fluid is fed in a parallel feed configuration to two or more of said first energy storage bank, said second energy storage bank and said third energy storage bank;

said control system controlled by a controller that is at least one of a thermostat, a mechanical controller, an electrical controller, and a control program running on a programmable computation system, said control system configured by the controller to provide flow of said first heat transfer fluid respectively to feed one or more of said first energy storage bank, said second energy storage bank and said third energy storage bank in response to at least one of a physical state of said respectively fed energy storage bank and the physical state of the environment surrounding the thermal store;

said control system configured to control a first flow rate of a first flow of said first heat transfer fluid to at least one of at least one of said first energy storage bank, said second energy storage bank and said third energy storage bank;

and said control system configured to control a second flow rate of a second flow of said first heat transfer fluid to another of said first energy storage bank, said second energy storage bank and said third energy storage bank;

said control system configured to control said first flow rate optionally at a different flow rate than said second flow rate;

a second heat transfer fluid flowing to at least one of said first energy storage bank, said second energy storage bank and said third energy storage bank;

wherein said second heat transfer fluid is fed in series to two or more of said first energy storage bank, said second energy storage bank and said third energy storage bank, wherein the control system adapts the thermal energy transfers within, and at least one of to and from the thermal energy store;

wherein at least one or more of the thermal energy storage banks contains a thermal energy storage material comprising a single material or a mixture of materials;

wherein the thermal energy storage material of at least two of said three or more thermal energy storage banks comprises a different thermal energy storage material, and each of said different thermal energy storage material has a different melting point;

wherein at least one of said thermal energy storage banks comprises a first thermal energy storage material having a first transition temperature and at least one of said thermal energy storage banks comprises a second thermal energy storage material having a second transition temperature, said first transition temperature and said second transition temperature differing in transition temperature in a range of 5° C. to 35° C.;

wherein a plurality of said thermal energy storage banks respectively have different of said thermal energy storage materials which have different said transition temperatures and each of the plurality of said thermal energy storage banks have a respective feed inlet to receive a flow of said first heat transfer fluid;

wherein said control system is configured to control the feed of said first heat transfer fluid to a respective thermal energy storage bank based upon the transition temperature of the thermal energy storage material of the respective thermal energy storage bank;

said control system configured to selectively control which one or more of said plurality of said thermal energy storage banks is fed said first heat transfer fluid through the respective feed inlet based upon the transition temperature of the thermal energy storage material of a respective thermal energy storage bank;

wherein said thermal energy storage material comprises material that undergoes one or more of an energy absorbing phase transition at one or more temperatures within an operating temperature range of each bank and an energy releasing phase transition at one or more temperatures within the operating temperature range of the respective bank;

wherein each phase transition is associated with a change in at least one of a physical property and a chemical property of said thermal energy storage material;

wherein each of said first energy storage bank, said second energy storage bank and said third energy storage bank contain a heat exchanger which is configured to exchange heat with a second heat transfer fluid which is fed to said configuration of three or more thermal energy storage banks and said second heat transfer fluid is configured to provide an energy transfer connection with at least one thermal energy sink which is external to the thermal energy store and to exchange heat with said at least one thermal energy sink.

2. A thermal energy store according to claim 1, wherein one or more of said thermal energy storage banks is capable of at least one of storing and releasing thermal energy at a range of one or more temperatures;

said storing or releasing thermal energy can occur at least one of to and from of at least one of thermal energy sources and sinks simultaneously, or at different times; and wherein said phase transitions are reversible without substantial loss of energy absorbing, energy storing or energy releasing capacity across at least two reversible cycles.

3. The thermal energy store of claim 1, wherein the phase transition absorbs or releases substantially more energy at the said one or more temperatures than would be the case taking account solely of the energy absorbed or released as specific heat and wherein at least one bank contains one or more heat exchanger means operable to permit thermal energy to be transferred.

4. The thermal energy store of claim 1, wherein the thermal store, each bank and a plurality of banks are capable of accepting, storing and releasing thermal energy from one or more thermal energy sources and/or sinks simultaneously or at different times and wherein a first bank of the thermal store is at least partially enclosed within a second bank.

5. The thermal energy store of claim 1, wherein thermal energy is caused to move within or through a thermal energy transfer connection by the application of external energy selected from the group consisting of one or more of pumping a heat transfer fluid, heat pumping, thermoelectric effects, thermionic emission, convection, thermosyphoning and capillary action, in such a way as to promote the function of the thermal energy transfer connection to transfer thermal energy from a thermal energy source at one end of the thermal transfer connection to a thermal energy sink at the other end of the thermal transfer connection or vice-versa and wherein a thermal energy transfer connection comprises one or more devices for transferring heat from a lower temperature body to a higher temperature body,
wherein such devices are selected from one or more of the group consisting of a vapor compression heat pump; a chemical heat pump; a thermoelectric device; a thermionic device; and any other device operable to move heat from a lower temperature body to a higher temperature body.

6. The thermal energy store according to claim 5, wherein the thermal store incorporates integrally within its function, structure or control logic one or more devices for transferring heat from a lower temperature body to a higher temperature body and wherein at least one thermal energy transfer connection links two or more banks and comprises one or more devices for transferring heat from the lower temperature body to the higher temperature body.

7. The thermal energy store of claim 1, wherein at least a first and second bank having overlapping or identical operating temperature ranges are connected by thermal energy transfer connections, wherein at least a first and second bank having distinct, non-overlapping operating temperature ranges are connected by thermal energy transfer connections and wherein every bank within the thermal energy store is connected only to another bank having a phase transition temperature which is different than the phase transition temperature of the given bank.

8. The thermal energy store of claim 1, wherein at least one of the following: thermal energy source external to the thermal energy store and at least one thermal energy source within the thermal energy store lacks a direct thermal energy transfer connection via a destination bank within the thermal energy store, to at least one thermal energy sink external to the thermal energy store, or both; and wherein thermal energy can still be transferred between the source and destination or vice-versa and wherein transfer of thermal energy from a source using a first thermal energy transfer connection causes thermal energy to be added to the energy stored in the at least one intervening bank, where thermal energy is stored temporarily, and wherein simultaneously, previously, or later thermal energy is removed from the said intervening bank and transferred using a second thermal energy transfer connection to a destination.

9. The thermal energy store of claim 1, wherein sources and destinations of thermal energy transfers are switched in succession or in parallel such that at least at some times thermal energy is transferred from one external source to a selected bank when the thermal energy storage material in the selected bank has a lower average, maximum or minimum temperature than the temperature of the external source of thermal energy and wherein a selected bank is chosen because it is, at that time, the hottest bank amongst all banks of the thermal energy store that have temperatures lower than an external thermal energy source and/or the temperature of an external thermal energy source less a fixed temperature decrement.

10. The thermal energy store of claim 1, wherein a selected bank is chosen because it is, at that time, the bank most depleted in thermal energy and wherein after or at the same time as thermal energy is transferred from an external thermal energy source to a selected bank, potential to transfer thermal energy to other banks in the thermal energy store remains, and at least a further bank is selected to accept some or all of the remaining thermal energy that could be potentially transferred in sequence or at the same time to be further directed by an arrangement of one or more additional thermal energy transfer connections in sequence to heat exchanger means in one or more additional banks, wherein the one or more additional banks are visited in descending sequence of average, maximum or minimum temperature of the thermal energy storage material within each bank.

11. The thermal energy store of claim 1, wherein two or more sources or destinations of thermal energy transfers are switched in succession or parallel such that at a given time thermal energy is transferred to one external sink of thermal energy from a selected bank having a higher average, maximum, or minimum temperature in its thermal energy storage material than the temperature of the external sink of thermal energy, wherein a selected bank is chosen because it is, at that time, the coldest bank amongst all banks of the thermal energy store that have temperatures higher than an external thermal energy sink or the temperature of an external thermal energy sink plus a fixed temperature increment and wherein a selected bank is chosen because it is, at that time, the bank containing the largest quantity of thermal energy.

12. The thermal energy store of claim 1, wherein after or at the same time as thermal energy is transferred to an external thermal energy sink from a selected bank, potential to transfer thermal energy from other banks in the thermal energy store remains, and one or more further bank banks is selected to provide some or all of the remaining thermal energy that could be potentially transferred in sequence or at the same time to one or more additional banks, wherein the one or more additional banks are visited in descending or ascending sequence of average, maximum or minimum temperature of the thermal energy storage material within each bank before it is directed by a final thermal energy transfer connection to the external thermal energy sink from the last bank.

13. The thermal energy store of claim 1, wherein the number, order, phase transition temperature, current average, maximum or minimum temperature of banks to include in the transfer of thermal energy via an external source or an external sink is chosen such that the return temperature of any thermal energy transfer fluid that flows back from the thermal energy store is better adapted to or is optimally matched to a characteristic of the external source or external sink of any of the following:

the temperature at which thermal energy transfer fluid flowing into the external source or external sink will deliver, collect, reject, generate or convert thermal energy most optimally;

returning thermal energy transfer fluid to a solar thermal panel during the day at a low temperature so that radiative losses from the solar panel are minimized and therefore the solar panel operates as efficiently as possible to collect heat;

returning thermal energy transfer fluid to a solar thermal panel during the night or a radiator at a high temperature so that radiative losses from the solar panel or radiator are maximized and therefore the solar panel or radiator operates as efficiently as possible to reject heat;

returning thermal energy transfer fluid to a gas boiler within the design temperature range for which its operation is designed and rated to be most efficient; or returning thermal energy transfer fluid to a back boiler in a wood-burning stove at a temperature at which the thermal energy transfer fluid will not boil, and at which the structure of the stove will not crack due to thermal stress.

14. The thermal energy store of claim 1, wherein an external source of thermal energy is selected from a group consisting of a fluid, environment containing waste, excess thermal energy from a process including that of exhaust warm air from a building in a cold environment, exhaust cool air from a building in a warm environment, waste warm water from bathing or showering, oil in a heat engine requiring cooling before re-use, a fuel cell, a biogas digester and a bio-fuel production plant, wherein the thermal energy store is used to capture waste heat, excess heat or both from a fluid, an environment, or both, and wherein the rate of thermal energy transfer from lower to higher temperature banks is lower than the peak rate at which thermal energy transfers to the lower temperature banks from waste or excess energy sources.

15. The thermal energy store of claim 1, wherein the thermal energy store is used is one or more thermal energy stores selected from the group consisting of:

a heating system; to provide a heating service;
a cooling system; to provide a cooling service;
a combined heating and cooling system used at the same time as both a cooling system and a heating system to simultaneously provide heating and cooling services;
a combined heating and cooling system used at different times as both a cooling system and a heating system to provide heating and cooling services at different times;
a central heating system;
a distributed space heating system;
water heating;
heating thermal energy transfer fluids to provide industrial process-heat,
directly heating working fluids of an industrial process;
cooling thermal energy transfer fluids to provide industrial process-cooling,
directly cooling working fluids of an industrial process,
heating heat-transfer fluids for use in a machine that converts thermal energy, or temperature differences, into electrical or mechanical energy;
a central cooling or air conditioning system;
a distributed space cooling or air conditioning system; and
a refrigeration system.

16. The thermal energy store of claim 15, wherein the thermal energy transfer fluid is a liquid or a refrigerant, wherein at least one bank of the thermal energy store is used as a thermal store for at least one of the following: heating, cooling, or a combined service, or is used as a thermal store for at least one service that is used at least some of the time for heating and the same service is used at least some of the time for cooling, wherein the thermal energy store is used for one or more heating or cooling functions selected from the group consisting of space heating, cooling delivered through radiant walls, under-floor heating, radiant ceilings, chilled beams, radiators, over-sized radiators, fan-coil radiators and air handling systems.

17. The thermal energy store of claim 1, wherein at least a sub-part of at least one bank of the thermal energy store is physically co-located with or adjacent to a point of delivery of the service for which it is a thermal energy reservoir and is selected to have a usual operating temperature range suitable to directly drive said service, wherein the thermal energy store is used inside one or more devices selected from the group consisting of domestic appliances, commercial appliances, industrial appliances, and machinery, and wherein the machinery is selected from the group consisting of a dishwasher, a washing machine, a machine that delivers hot and cold drinks; a vending machine for hot food; a vending machine for hot drinks; a vending machine for cold food; a vending machine for cold drinks; a system incorporating re-usable and re-chargeable heated cups, and a system incorporating re-usable and re-chargeable cooled cups.

18. The thermal energy store of claim 1, wherein at least one bank or the whole thermal energy store is used as a heat battery, a cool battery, or both.

19. The thermal energy store of claim 1, wherein the at least one thermal energy source or thermal energy sink is selected from the group consisting of flat plate solar collectors; evacuated tube solar collectors; roof tiles; dedicated solar air heaters; photovoltaic panels; and hybrid solar thermal photovoltaic panels; and wherein the at least one thermal energy source is waste heat from an electronic assembly or other device that generates waste heat selected from the group consisting of computer processors; micro-processors; amplifiers; batteries; lighting equipment; LED lighting; an electric motor; an internal combustion engine; and photovoltaic solar cells.

20. The thermal energy store of claim 1, wherein the ability to transfer thermal energy, of one or more of the following: a thermal energy transfer connection; a part of a thermal energy transfer connection; heat exchanger means within a bank connected to such a thermal energy transfer connection; and heat exchanger means external to the thermal energy store connected to such a thermal energy transfer connection, is modulated between a state in which the ability to transfer thermal energy is maximally resistant to, or completely incapable of, transferring thermal energy and a state in which the ability to transfer thermal energy is at its minimal resistance to transferring thermal energy or; is modulated to any degree of permissiveness between the minimum and maximum levels.

21. A thermal energy store according to claim 1, wherein the thermal store is capable of at least one of storing and releasing thermal energy at a range of one or more temperatures;

said storing or releasing thermal energy can occur at least one of to and from at least one of thermal energy sources and sinks simultaneously, or at different times; and wherein said phase transitions are reversible without substantial loss of energy absorbing, energy storing or energy releasing capacity across at least two reversible cycles.

22. The thermal energy store according to claim 1, wherein an exchange of heat from at least two of said first energy storage bank, said second energy storage bank and said third energy storage bank is a heat exchange transferring heat into the second heat transfer fluid; and wherein the heat exchange transferring heat into the second heat transfer fluid is counter to a heat exchange of the first heat transfer fluid.

23. The thermal energy store according to claim 1, wherein each of said first feed flow rate is based upon data comprising at least the temperature of said first energy storage bank, said second feed flow rate is based upon data comprising at least the temperature of said second energy storage bank, and said third feed flow rate is based upon data comprising at least the temperature of said third energy storage bank.

\* \* \* \* \*